United States Patent
Murata et al.

(10) Patent No.: US 9,195,104 B2
(45) Date of Patent: Nov. 24, 2015

(54) LIQUID CRYSTAL PANEL AND LIQUID CRYSTAL DISPLAY APPARATUS

(75) Inventors: Mitsuhiro Murata, Osaka (JP); Shuichi Kozaki, Osaka (JP); Takehisa Sakurai, Osaka (JP); Yosuke Iwata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 194 days.

(21) Appl. No.: 13/814,018

(22) PCT Filed: Jul. 29, 2011

(86) PCT No.: PCT/JP2011/067402
§ 371 (c)(1),
(2), (4) Date: Jul. 8, 2013

(87) PCT Pub. No.: WO2012/017931
PCT Pub. Date: Feb. 9, 2012

(65) Prior Publication Data
US 2013/0293818 A1 Nov. 7, 2013

(30) Foreign Application Priority Data

Aug. 5, 2010 (JP) ................................. 2010-176387

(51) Int. Cl.
G02F 1/1343 (2006.01)
G02F 1/1337 (2006.01)

(52) U.S. Cl.
CPC ...... *G02F 1/13439* (2013.01); *G02F 1/133707* (2013.01); *G02F 1/134363* (2013.01); *G02F 2201/305* (2013.01)

(58) Field of Classification Search
CPC . G02F 1/1335; G02F 1/13439; G02F 1/1343; G02F 2201/305; G02F 1/34363; G02F 1/133707
USPC ........................... 349/106, 139, 141, 201, 167
See application file for complete search history.

(56) References Cited

U.S. PATENT DOCUMENTS

2001/0050742 A1   12/2001   Takeda et al.
2004/0066480 A1*  4/2004    Yoshida et al. ............... 349/123
(Continued)

FOREIGN PATENT DOCUMENTS

| JP | 2000-193977 A | 7/2000 |
| WO | 2010/041491 A1 | 4/2010 |
| WO | 2010/044289 A1 | 4/2010 |

OTHER PUBLICATIONS

Official Communication issued in International Patent Application No. PCT/JP2011/067402, mailed on Oct. 11, 2011.
(Continued)

*Primary Examiner* — Dung Nguyen
*Assistant Examiner* — Tai Duong
(74) *Attorney, Agent, or Firm* — Keating & Bennett, LLP

(57) ABSTRACT

A liquid crystal panel (2) is a vertical alignment type liquid crystal panel using a horizontal electric field driving system which performs display by driving a liquid crystal layer (50) interposed between substrates (10, 20) in a horizontal electric field, each pixel includes three sub-pixels (6R, 6G, and 6B), which are of red, green, and blue, comb-shaped electrodes (14, 15) include a function as a diffraction grating with the comb-shaped electrodes (14, 15) and spaces between the comb-shaped electrodes (14, 15), and pitch distances (D) between electrodes are set such that an optical diffraction efficiency for red wavelength and an optical diffraction efficiency for green wavelength are greater than an optical diffraction efficiency for blue wavelength. Thus, it is possible to provide a liquid crystal panel and a liquid crystal display apparatus having a wide viewing angle with less color change with a simple configuration.

8 Claims, 18 Drawing Sheets

(56) References Cited

U.S. PATENT DOCUMENTS

| | | |
|---|---|---|
| 2005/0001975 A1* | 1/2005 | Ishihara et al. ............... 349/201 |
| 2006/0203137 A1* | 9/2006 | Nakayoshi et al. ............. 349/38 |
| 2006/0250561 A1 | 11/2006 | Takeda et al. |
| 2008/0158486 A1* | 7/2008 | Kim et al. .................... 349/106 |
| 2011/0199568 A1 | 8/2011 | Morishita et al. |
| 2011/0317118 A1 | 12/2011 | Okazaki et al. |

OTHER PUBLICATIONS

Kogelnik, "Coupled Wave Theory for Thick Hologram Gratings", The Bell System Technical Journal, vol. 48, No. 9, Nov. 1969, pp. 2909-2947.

\* cited by examiner

LIQUID CRYSTAL PANEL AND LIQUID CRYSTAL DISPLAY APPARATUS

TECHNICAL FIELD

The present invention relates to a liquid crystal panel and a liquid crystal display apparatus.

BACKGROUND ART

The liquid crystal display apparatus is advantageous since it is thin and lightweight and requires less power consumption among various display apparatuses. Accordingly, in recent years, instead of CRT (cathode-ray tube) displays, liquid crystal display apparatus is widely used in various fields such as a TV (television), a monitor, a mobile phone, and the like.

The display system of the liquid crystal display apparatus is determined depending on alignment of liquid crystal molecules in liquid crystal cells. As one of the display system of the liquid crystal display apparatus, in the related art, a liquid crystal display apparatus with MVA mode as shown in FIG. 21 is known (for example, Patent Document 1). The MVA mode is a system in which slits are provided in pixel electrodes of an active matrix substrate, protrusions (ribs) for alignment control of liquid crystal molecules which are provided on counter electrodes of a counter substrate, and thus an electrical field in the vertical direction added, and the liquid crystal molecules are aligned in a plurality of directions while controlling the ribs and slits in an alignment direction.

In the liquid crystal display apparatus in the MVA mode, the wide viewing angle is realized by dividing the direction in which the liquid crystal molecules are laid into plural directions at the time of applying an electric field.

CITATION LIST

Patent Literature

PTL 1: Japanese Unexamined Patent Application Publication No. 2000-193977 (Publication date: Jul. 14, 2000)

SUMMARY OF INVENTION

Technical Problem

However, in addition to complicated manufacturing steps, a liquid crystal display apparatus in a MVA mode has a problem in that white color is seen to be tinged with yellow, when seen from a predetermined angle, for example, in a direction with an azimuth θ of 45°, and a polar angle φ of 45° or 60°. In addition, as shown in FIG. 4, the azimuth θ is a rotation angle in a flat plane of a line connecting foot of a perpendicular lowered to a flat plane including a surface of a polarizer 36 on the liquid crystal panel from an observing point and a center 36c of the polarizer 36. In the example of FIG. 4, an azimuth θ1 of an observing point P1 is 0° (parallel to a polarizing axis), and an azimuth θ2 of an observing point P2 is 90°. In addition, the polar angle φ is an angle formed by a straight line connecting the center 36c of the polarizer 36 on the liquid crystal display panel and the observing point, with a normal line of the polarizer 36. A polar angle of the observing point P1 is shown as φ1, and a polar angle of the observing point P2 is shown as φ2.

The invention is made in consideration of these circumstances and an object thereof is to provide a liquid crystal panel and a liquid crystal display apparatus having a wide viewing angle with less color change, with a simple configuration.

Solution to Problem

For solving the problems, a liquid crystal panel according to the present invention includes:

a first substrate on which first electrodes and second electrodes are provided with pitch distances between the first electrodes and the second electrodes, respectively; a second substrate provided to face the first substrate; and a liquid crystal layer sandwiched between the first substrate and the second substrate, the horizontal electric field driving system is used in which the liquid crystal layer is driven with horizontal electric fields generated between the first electrodes and the second electrodes, and liquid crystal molecules in the liquid crystal layer are aligned vertically to the first substrate and the second substrate when no electric field is applied on the liquid crystal molecules, each pixel includes three sub-pixels, which are of red, green, and blue, the first electrodes and the second electrodes function as a diffraction grating constituted by the first electrodes, the second electrodes, and the pitch distances therebetween, and the pitch distances between the first electrodes and the second electrodes are set such that an optical diffraction efficiency for red wavelength and an optical diffraction efficiency for green wavelength are greater than an optical diffraction efficiency for blue wavelength.

In the liquid crystal panel including the above configuration, alignment directions of the liquid crystal molecules are controlled by driving the horizontal electric field while maintaining high contrast derived from vertical alignment. This makes it unnecessary to perform alignment control by protrusions as in MVA mode, thereby realizing excellent viewing angle characteristics by a simple pixel configuration.

In addition, the first electrodes and the second electrodes function as a diffraction grating provided on the same substrate with the pitch distances therebetween.

In the liquid crystal panel in MVA mode of the related art (Comparative Example), at a location in a direction inclined with respect to the polarizing axis (for example, azimuth θ=45°), as the polar angle φ with respect to the liquid crystal panel becomes larger, the shifting amounts (change amounts) of the white color (W) become larger, and problem in that the white color is seen to be tinged with yellow, occurs (see FIGS. 10 and 15).

Herein, with the verification results of the color shifting which will be described later, by using functions of the diffraction grating due to the first and second electrodes, it was found that, in a case where the pitches (electrode pitches D) of first and second electrodes are set to be the predetermined value (for example, D=10 μm), the shifting amounts of red color (R) and green color (G) become larger than the shifting amounts of blue color (B), and the shifting amounts of the white color (W) become smaller (see FIG. 16).

Further, it was found that there was a correlation between the diffraction efficiency, the electrode pitch D, and the wavelength of the colors, and in a case where the electrode pitch D is in the predetermined range, as the wavelength is longer, the diffraction efficiency becomes larger (see FIGS. 12, 13, and 14). From the result of the electrode pitch D=10 μm (FIG. 16) which is in the predetermined range, it was investigated that, as the diffraction efficiency becomes larger, the color shifting amounts become significant.

That is, in a case where the electrode pitch D is in the predetermined range, it was found that, when the optical diffraction efficiency for red wavelength and the optical diffraction efficiency for green wavelength are larger than the optical diffraction efficiency for blue wavelength, the shifting amounts of the white color is slight.

Accordingly, by setting the pitch distances (electrode pitch D) between the first and second electrodes so that the optical diffraction efficiency for red wavelength and the optical diffraction efficiency for green wavelength are larger than the optical diffraction efficiency for blue wavelength, it is possible to suppress the color change (see FIGS. 10 and 16) occurred in the related art.

Thus, according to the configuration described above, it is possible to realize a liquid crystal panel having a wide viewing angle with less color change with a simple configuration.

Advantageous Effects of Invention

The liquid crystal panel and the liquid crystal display apparatus according to the present invention are the vertical alignment type liquid crystal panel using the horizontal electric field driving system, the first and second electrodes include a function as the diffraction grating, and the pitch distances between the first and second electrodes are set so that the optical diffraction efficiency for red wavelength and the optical diffraction efficiency for green wavelength are larger than the optical diffraction efficiency for blue wavelength.

Thus, according to the present invention, it is possible to provide a liquid crystal panel and a liquid crystal display apparatus having a wide viewing angle with less color change with a simple configuration.

BRIEF DESCRIPTION OF DRAWINGS

FIG. 1 is a cross sectional view schematically illustrating an outline configuration of a main part of a liquid crystal panel according to Embodiment 1 of the present invention.

FIG. 2 is a cross sectional view schematically illustrating an outline configuration of a comb-shaped electrode of the liquid crystal panel shown in FIG. 1.

FIG. 3 is a cross sectional view schematically illustrating an outline configuration of a liquid crystal display apparatus in accordance with Embodiment 1 of the present invention.

FIG. 4 is a view for illustrating an azimuth and a polar angle.

FIG. 5(a) shows chromaticity coordinates in a case where the azimuth θ=0° (parallel to a polarizing axis) for a liquid crystal panel of Comparative Example, and FIG. 5(b) shows a CIE view where the values are plotted.

FIG. 6(a) shows chromaticity coordinates in a case where the azimuth θ=45° (45° with respect to a polarizing axis) for a liquid crystal panel of Comparative Example, and FIG. 6(b) shows a CIE view where the values are plotted.

FIG. 7(a) shows chromaticity coordinates in a case where the azimuth θ=0° (parallel to a polarizing axis) for a liquid crystal panel (1) of Example 1, and FIG. 7(b) shows a CIE view where the values are plotted.

FIG. 8(a) shows chromaticity coordinates in a case where the azimuth θ=45° (45° with respect to the polarizing axis) for the liquid crystal panel (1) of Example 1, and FIG. 8(b) shows a CIE view where the values are plotted.

FIG. 10 is a graph in which the shifting amounts of Table 6 and Table 8 are plotted.

FIG. 11 is a view for calculating an average refractive index.

FIG. 12(a) is a graph showing diffraction efficiency corresponding to an electrode pitch D of 4 μm of Table 9, FIG. 12(b) is a graph showing diffraction efficiency corresponding to an electrode pitch D of 5 μm of Table 9, and FIG. 12(c) is a graph showing diffraction efficiency corresponding to an electrode pitch D of 6 μm of Table 9.

FIG. 13(a) is a graph showing diffraction efficiency corresponding to an electrode pitch D of 8 μm of Table 10, FIG. 13(b) is a graph showing diffraction efficiency corresponding to an electrode pitch D of 10 μm of Table 10, and FIG. 13(c) is a graph showing diffraction efficiency corresponding to an electrode pitch D of 11 μm of Table 10.

FIG. 14(a) is a graph showing diffraction efficiency corresponding to an electrode pitch D of 12 μm of Table 11, FIG. 14(b) is a graph showing diffraction efficiency corresponding to an electrode pitch D of 14 μm of Table 11, and FIG. 14(c) is a graph showing diffraction efficiency corresponding to an electrode pitch D of 64 μm of Table 11.

FIG. 15 is a graph showing a relationship between shifting amounts of each color (the R color, the G color, the B color, the W color) and the polar angles φ in a case where the azimuth θ of the liquid crystal panel of Comparative Example is 45°.

FIG. 16 is a graph showing a relationship between shifting amounts of each color (the R color, the G color, the B color, the W color) and the polar angles φ in a case where the azimuth θ of the liquid crystal panel (1) of Example 1 of the present invention is 45°.

FIG. 17 is a cross-sectional view schematically illustrating an outline configuration of a main part of a liquid crystal panel in accordance with Embodiment 2 of the present invention.

FIG. 18 is a cross-sectional view schematically illustrating an outline configuration of main parts of the liquid crystal panel in accordance with Embodiment 3 of the present invention.

FIG. 19 is a graph in which the shifting amounts of Table 27 and Table 28 are plotted.

FIG. 20 is a graph in which the shifting amounts of Table 29 and Table 30 are plotted.

FIG. 21 is a cross sectional view schematically illustrating an outline configuration of a main part of a liquid crystal panel of the related art used in comparison.

FIG. 22 is a cross sectional view schematically illustrating another outline configuration of a comb-shaped electrode of the liquid crystal panel shown in FIG. 1.

DESCRIPTION OF EMBODIMENTS

[Embodiment 1]

The following explains an embodiment of the present invention with reference to FIGS. 1 to 16.

Initially, the following description discusses schematic configurations of a liquid crystal panel and a liquid crystal display apparatus in accordance with the present embodiment.

Figure 3:
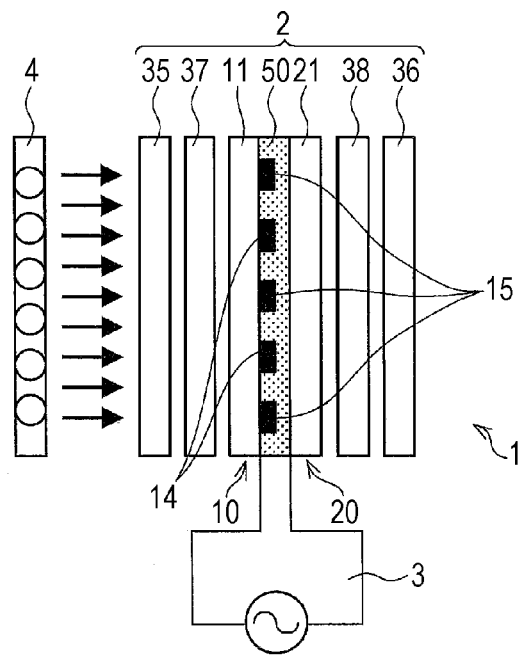
[FIG. 3]

FIG. 3 is a cross sectional view schematically illustrating an outline configuration of the liquid crystal display apparatus in accordance with the present embodiment.

As illustrated in FIG. 3, a liquid crystal display apparatus 1 in accordance with the present embodiment includes a liquid crystal panel 2 (liquid crystal display panel, liquid crystal display element), a driving circuit 3, and a backlight 4 (illuminating device). The driving circuit 3 and the backlight 4 have the same configurations as the conventional ones, and therefore explanations thereof are omitted here.

Figure 1:
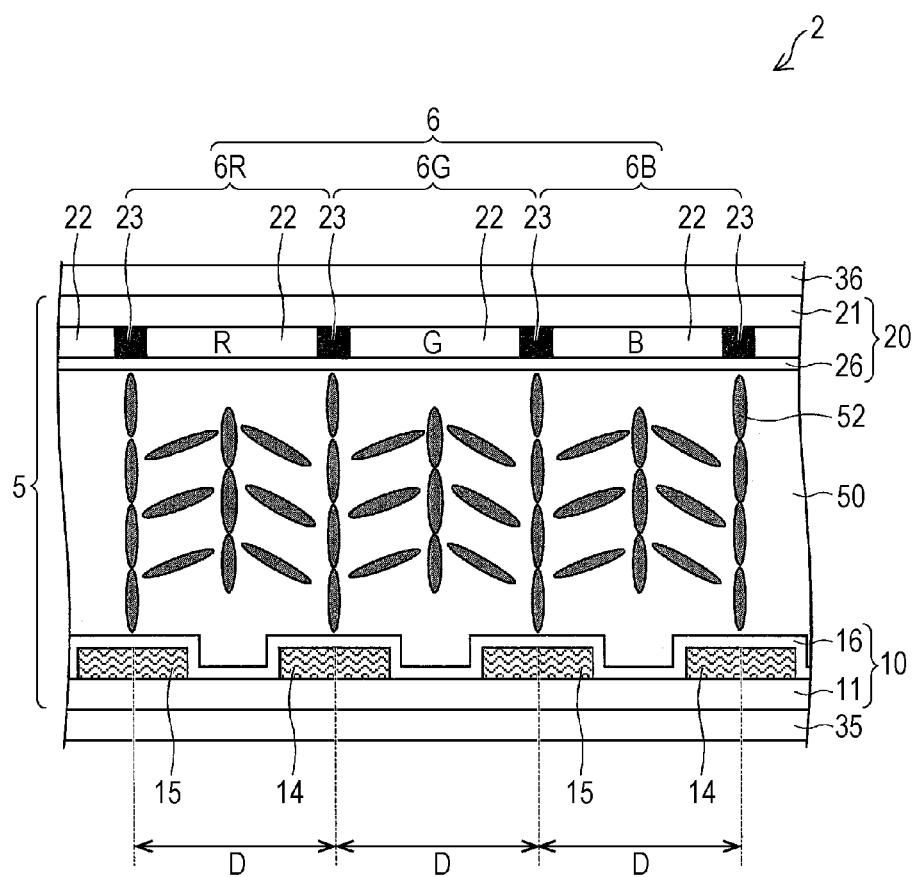
[FIG. 1]
Figure 2:
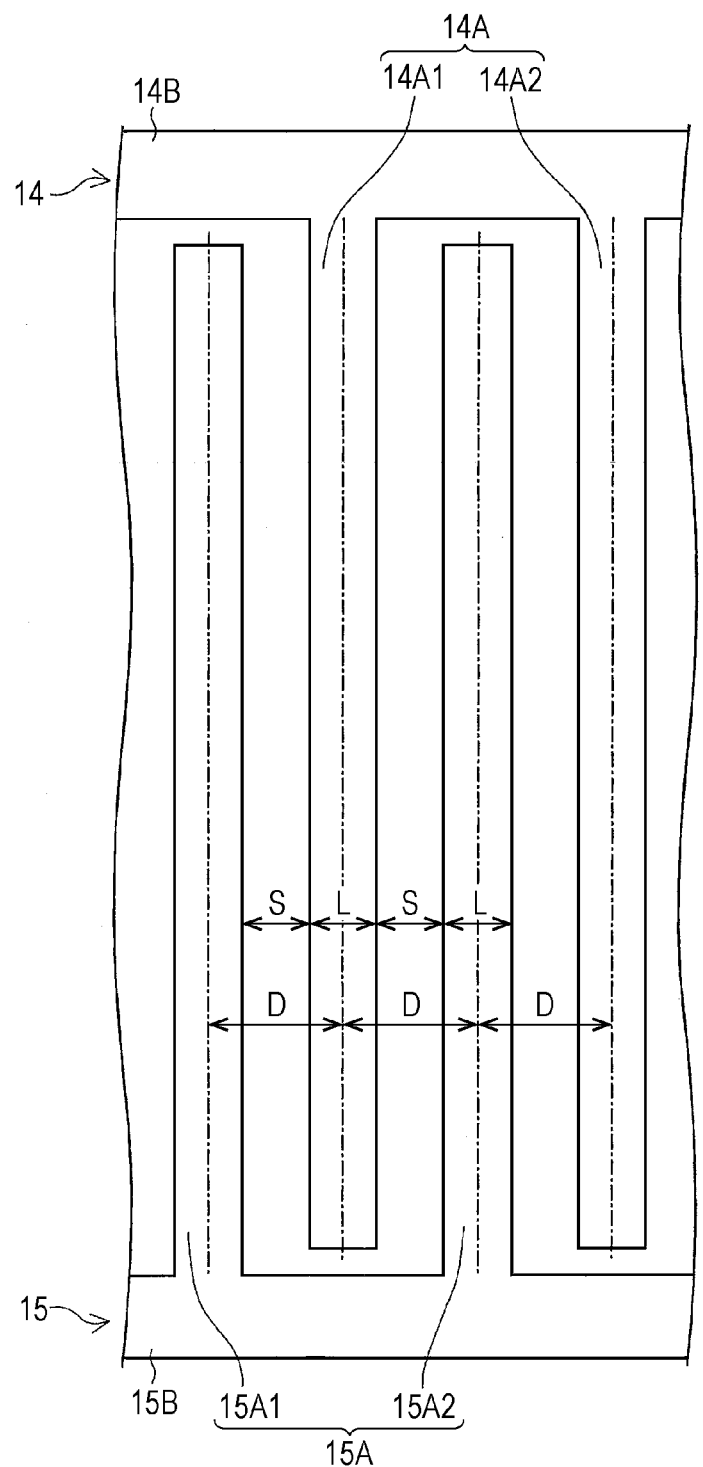
[FIG. 2]

FIG. 1 is a cross sectional view schematically illustrating an outline configuration of a main part of the liquid crystal panel 2. FIG. 2 is a plan view illustrating an outline configuration of a comb-shaped electrode of the liquid crystal panel 2.

The liquid crystal panel 2 in accordance with the present embodiment is a vertical alignment type liquid crystal panel using a horizontal electric field system.

As illustrated in FIGS. 1 and 3, the liquid crystal panel 2 includes a liquid crystal cell 5, polarizers 35 and 36, and if necessary, phase plates 37 and 38.

The liquid crystal cell 5 includes, as an array substrate and a counter substrate, a pair of substrates 10 and 20 that are positioned to face each other, and includes a configuration in that a liquid crystal layer 50 is interposed between the pair of substrates 10 and 20.

At least one of the pair of substrates 10 and 20 (i.e. at least a substrate closer to a viewer) is made of a transparent substrate such as a glass substrate as an insulating substrate (liquid crystal layer holding member, base substrate). In the present embodiment, a description will be provided as to a case where the insulating substrate is a glass substrate. However, the present invention is not limited to this case.

Each of the substrates 10 and 20 may be an array substrate (active matrix substrate) such as a TFT (Thin Film Transistor) substrate, a CF (Color Filter) substrate etc.

A description will be provided below as to a case where a substrate closer to a display plane (viewer) is regarded as an upper substrate and the other substrate is regarded as a lower substrate, the substrate 10 which is the lower substrate is an array substrate, and the substrate 20 which is the upper substrate is a counter substrate. However, the present embodiment is not limited to this case.

Initially, a description will be provided below as to configurations of members of the liquid crystal cell 5. Firstly, a description will be provided as to a configuration of the substrate 10 (first substrate, array substrate).

The substrate 10 is an array substrate as described above, and includes, as switching elements, TFTs (not illustrated) for example.

As illustrated in FIG. 1, the substrate 10 has a configuration in which comb-shaped electrodes 14 and 15 (first electrode and second electrode, see FIG. 2) and an alignment film 16 are laminated in this order on a glass substrate 11. The comb-shaped electrodes 14 and 15 are electrodes for generating a horizontal electric field.

The comb-shaped electrodes 14 and 15 formed on the glass substrate 11 are electrodes each having a comb shape, and are configured by a main electrode (main line) and tooth electrodes 14A and 15A (diverging lines) which extend from respective main lines.

As illustrated in FIGS. 1 and 2, the comb-shaped electrodes 14 and 15 are positioned alternately in such a manner that the tooth electrodes 14A (14A1, 14A2, . . . , 14Am; m is an integer equal to or greater than 1) of each comb-shaped electrode and the tooth electrodes 15A (15A1, 15A2, . . . , 15An; n is an integer equal to or greater than 1) of each of comb-shaped electrodes 14 and 15 interleave each other.

The number (m, n) of teeth of the comb-shaped electrodes 14 and 15 (tooth electrodes 14A and 15A) in one pixel is not particularly limited, and is determined by a relation between a pixel pitch and an electrode pitch D of the comb-shaped electrodes 14 and 15 (i.e. distance between the center of the tooth electrode 14A which center is an electrode line and the center of the tooth electrode 15A which center is an electrode line) etc. For example, in a case where the pixel pitch is 100 µm, an electrode width L of each of the comb-shaped electrodes 14 and 15 (i.e. width of each of the tooth electrodes 14A and 15A) is 2.5 µm, and an electrode distance S between the comb-shaped electrodes 14 and 15 (i.e. distance corresponding to a gap (space) between the tooth electrodes 14A and 15A) is 7.5 µm, the electrode pitch D of the comb-shaped electrodes 14 and 15 is 10 µm so that five tooth electrodes 14A of each comb-shaped electrode 14 and five tooth electrodes 15A of each comb-shaped electrode 15, i.e. ten tooth electrodes in total, can be provided in one pixel. The electrode pitch D of the comb-shaped electrodes 14 and 15 (=(L+S)/2) is set to be within a predetermined range. A specific range of the electrode pitch D will be described later.

The comb-shaped electrode 14 (first electrode) which is one of the pair of the comb-shaped electrodes 14 and 15 is a common electrode and is mainly set to 0 V. The comb-shaped electrode 15 (second electrode) which is the other electrode is a pixel electrode, and is connected with a drain electrode (not illustrated) and is electrically connected with a signal line via a switching element such as a TFT, and a signal corresponding to a video signal is applied onto the comb-shaped electrode 15.

The alignment film 16 is a so-called vertical alignment film which aligns liquid crystal molecules 52 of the liquid crystal layer 50 vertically with respect to a substrate plane when no electric field is applied. It should be noted that "vertical(ly)" here includes "substantially vertical(ly)". The alignment film 16 is provided on the glass substrate 11 in such a manner as to cover the comb-shaped electrodes 14 and 15.

Next, a description will be provided below as to a configuration of the substrate 20 (second substrate, CF substrate).

The substrate 20 has a structure in which color filters 22 of R (red), G (green), and B (blue) and black matrices 23 and the alignment film 26 are provided in this order on a glass substrate 21.

Each pixel 6 (i.e. one pixel) is constituted by three sub-pixels 6R, 6G, and 6B (dots) of R, G, and B, respectively. As illustrated in FIG. 1, the sub-pixels 6R, 6G, and 6B have R-, G-, and B-color filters 22 that transmit light with wavelengths corresponding to R, G, and B, respectively.

In FIGS. 1 and 2, for convenience of illustration and description, each of the sub-pixels 6R, 6G, and 6B is provided in such a manner as to correspond to a space between adjacent tooth electrodes 14A and 15A of the comb-shaped electrodes 14 and 15, respectively. However, as described above, the number (m, n) of the tooth electrodes 14A and 15A is in fact determined by the relation among the electrode width L, the electrode distance S, the pixel pitch, and the electrode pitch D of the comb-shaped electrodes 14 and 15, and a plurality of the tooth electrodes 14A and a plurality of the tooth electrodes 15A may be provided in such a manner as to be in a space corresponding to each of the sub-pixels 6R, 6G, and 6B.

Similarly with the alignment film 16, the alignment film 26 is a so-called vertical alignment film. The alignment film 26 is formed on a whole display area of the substrate 20 (i.e. area surrounded by a non-illustrated sealing agent) in such a manner as to cover the color filters 22 and the black matrices 23.

The liquid crystal layer 50 sandwiched by the substrates 10 and 20 is formed in such a manner that a retardation $\Delta nd$ meets a relation $280 \leq \Delta nd \leq 350$. This allows providing high contrast.

(Method for Forming Substrate)

Subsequently, a description will be provided below as to materials of individual layers of the substrates 10 and 20 and to methods for forming individual layers.

Materials of the comb-shaped electrodes 14 and 15 are not particularly limited and may be made of a transparent electrode material such as ITO (indium tin oxide), IZO (indium zinc oxide), or the like, or may be made of a metal such as aluminum. These electrodes may be made of the same electrode material or may be made of different electrode materials.

A method for forming (laminating) these electrodes is not particularly limited, and may be any of conventional and publicly known methods such as sputtering, vacuum evaporation, and plasma CVD. A method for patterning these electrodes is not particularly limited, and may be a publicly known patterning method such as photolithography.

A thickness of these electrodes is not particularly limited, and is preferably within a range of 100 Å to 2000 Å.

Materials of the alignment films 16 and 26 and a method for forming the alignment films 16 and 26 are not particularly limited. The alignment films 16 and 26 can be formed by applying, on the comb-shaped electrodes 14 and 15 or the color filters 22 and the black matrices 23, a publicly known alignment film material capable of regulating vertical alignment of liquid crystal molecules.

The liquid crystal cell 5 of the liquid crystal panel 2 is formed by attaching the substrates 10 and 20 to each other by a sealing agent (not illustrated) with spacers (not illustrated) between the substrates 10 and 20 and sealing a medium containing a liquid crystal material in a space between the substrates 10 and 20.

The material of the liquid crystal may be either of p (positive) liquid crystal material in which the liquid crystal molecules 52 have positive dielectric anisotropy $\Delta \in$ and n (negative) liquid crystal material in which the liquid crystal molecules 52 have negative dielectric anisotropy $\Delta \in$.

A specific example of the p liquid crystal material is a nematic liquid crystal material. An example of the n liquid crystal material is a banana-shaped liquid crystal material. In the present embodiment, a description will be provided as to a case where the liquid crystal material is a p liquid crystal material. However, the present invention is not limited to this, since only difference between use of the p liquid crystal material and use of the n liquid crystal material lies in difference in direction of bend alignment (bend alignment).

As illustrated in FIGS. 1 and 3, the liquid crystal panel 2 is formed by attaching, to the liquid crystal cell 5, the polarizers 35 and 36 and, if necessary, the phase plates 37 and 38.

As illustrated in FIGS. 1 and 3, the polarizers 35 and 36 are provided on the substrates 10 and 20 so as to be on planes opposite to planes facing the liquid crystal layer 50, respectively. As illustrated in FIG. 3, the phase plates 37 and 38 are provided if necessary between the substrate 10 and the polarizer 35 and between the substrate 20 and the polarizer 36, respectively. The phase plates 37 and 38 may be provided only one plane of the liquid crystal panel 2. In a case of a display device which uses only frontal transmitted light, the phase plates 37 and 38 are not necessarily required.

The polarizers 35 and 36 are positioned in such a manner that, for example, transmission axes of the polarizers 35 and 36 are perpendicular to each other and directions in which the tooth electrodes 14A and 15A are extended and the transmission axes of the polarizers 35 and 36 form an angle of 45°.

(Display Method)

Next, a description will be made below as to a display method (vertical alignment in-plane switching mode) of the liquid crystal panel 2 with reference to FIG. 1.

As described above, the liquid crystal panel 2 is configured such that vertical alignment films are provided as the alignment films 16 and 26 on the surfaces of the substrates 10 and 20, respectively. Consequently, in the liquid crystal panel 2, the liquid crystal molecules 52 are aligned vertically with respect to the substrate plane when no electric field is applied.

In the liquid crystal panel 2, display is performed by applying a potential difference across the pixel electrode and the common electrode on the substrate 10. That is, display of the liquid crystal panel 2 is performed by applying a potential difference across a pair of comb-shaped electrodes 14 and 15. The potential difference causes horizontal electric fields between the comb-shaped electrodes 14 and 15, so that the liquid crystal molecules 52 are tilted to be in parallel with the substrate plane.

Consequently, in a case of using the p liquid crystal material, the liquid crystal molecules 52 are bend-aligned in an arched manner in a thickness direction of the substrate, as shown in FIG. 1. In a case of using the n liquid crystal material, the liquid crystal molecules 52 are bend-aligned in an arched manner in an in-plane direction of the substrate. Thus, in either case, the liquid crystal molecules 52 exhibit birefringence with respect to light traveling in a direction normal to the substrate plane.

As described above, in the liquid crystal panel 2, display is performed by controlling light intensity of light transmitted by the liquid crystal panel 2 by tilting the liquid crystal molecules 52 by horizontal electric fields generated between the comb-shaped electrodes 14 and 15.

The liquid crystal molecules 52 sequentially change their alignment from homeotropic alignment to bend alignment. Consequently, in normal driving, as illustrated in FIG. 1, the liquid crystal layer 50 always exhibits bend alignment of liquid crystal molecules, allowing high speed response between grayscales.

Further, in the present mode, as described above, alignment directions of the liquid crystal molecules 52 are controlled by driving the horizontal electric field while maintaining high contrast derived from vertical alignment. This makes it unnecessary to perform alignment control by protrusions as in MVA mode, thereby realizing excellent viewing angle characteristics by a simple pixel configuration.

Furthermore, as described above, by in-plane switching in a vertical alignment mode, bent (arched) electric fields are generated by application of electric fields, and there are formed two domains whose director directions are different from each other by substantially 180° between adjacent comb-shaped electrodes 14 and 15, thereby realizing wide viewing angle characteristics.

Therefore, the liquid crystal panel 2 has advantages such as high responsibility due to bend alignment, a wide viewing angle due to self-compensated alignment, and high contrast due to vertical alignment, and advantages such as a simple structure, easiness in production, and low-expensiveness in production.

(Method for Producing Liquid Crystal Panel)

Next, a description will be provided below as to a method for producing the liquid crystal panel 2 by using a method for producing a liquid crystal panel (1) of Example 1 (which was used in later-mentioned inspection) as an example, and as to the result of the inspection of the effect yielded by the liquid crystal panel 2.

It should be noted that specific sizes, materials, production methods etc. of individual members in the following description are merely conditions for the inspection, and the following description is not intended to limit the scope of the present invention.

[Liquid Crystal Panel (1) of Example 1]

Initially, as illustrated in FIG. 1, ITO with a thickness of 1000 Å was formed byسputtering on the whole surface of the glass substrate 11, and the comb-shaped electrodes 14 and 15 with the electrode width L of 2.5 μm and the electrode distance S of 7.5 μm were formed by photolithography.

Next, an alignment film material (product name: JALS-204, made by JSR Corporation, solid content: 5 wt %, type: γ-butyrolactone solution) is coated on the glass substrate 11 by use of spin coating so as to cover the comb-shaped electrodes 14 and 15. Then, by baking the alignment film material at a temperature of 200° C. for 2 hours, a substrate 10 on which the alignment film 16 which is a vertical alignment film is provided was formed on a surface to be the opposite surface to the liquid crystal layer 50.

On the other hand, the color filters 22 and the black matrices 23 each with a thickness of 1.2 μm were formed by a well-known method on the glass substrate 21.

Next, columnar spacers were applied by spin coating on the color filters 22 and the black matrices 23, and then processed by photolithography to have a height of 3.4 μm.

After that, an alignment film material (product name: JALS-204, made by JSR Corporation, solid content: 5 wt %, type: γ-butyrolactone solution) is coated by use of spin coating. Then, by baking the alignment film material at a temperature of 200° C. for 2 hours, the substrate 20 on which the alignment film 26 which is a vertical alignment film is provided was formed on a surface to be the opposite surface to the liquid crystal layer 50. The dried-film thickness of the alignment films 16 and 26 thus formed was 1000 Å (=0.1 μm).

Subsequently, a sealing resin (product name: Struct Bond XN-215, made by Mitsui Toatsu Chemicals, Inc) as a sealant was printed on one of the substrates 10 and 20.

Next, the substrates 10 and 20 were combined together to be a pair and then heated at a temperature of 135° C. for 1 hour.

Next, a gap between the pair of substrates 10 and 20 was filled with a positive type liquid crystal material (Δ∈=18, Δn=0.1, made by Merck KGaA) as a liquid crystal material by a vacuum injection method. Thus, a liquid crystal cell 5, in which the liquid crystal layer 50 is sandwiched between the pair of the substrates 10 and 20, was produced.

Next, the polarizers 35 and 36 were attached with a back surface and a front surface of the liquid crystal cell 5, respectively, such that transmission axes of the respective polarizers 35 and 36 are at the right angle to each other and tooth electrodes 14A of the comb-shaped electrodes 14 and tooth electrodes 15A of the comb-shaped electrodes 15 extend in directions intersected with the transmission axes of respective polarizer 35 and 36 at an angle of 45°. In this way, the liquid crystal panel 2 (liquid crystal display element) illustrated in FIG. 1 was prepared.

[Liquid Crystal Panel of Comparative Example]

Next, in order to inspect the effect yielded by the liquid crystal panel 2, a description will be provided below as to a structure of a MVA mode liquid crystal panel used in comparison and to a method for producing the MVA mode liquid crystal panel.

The following description will mainly discuss differences between the liquid crystal panel 2 and the MVA mode liquid crystal panel used in comparison. Members having the same functions as those in the liquid crystal panel 2 are given the same reference numerals and explanations thereof are omitted.

Figure 21:
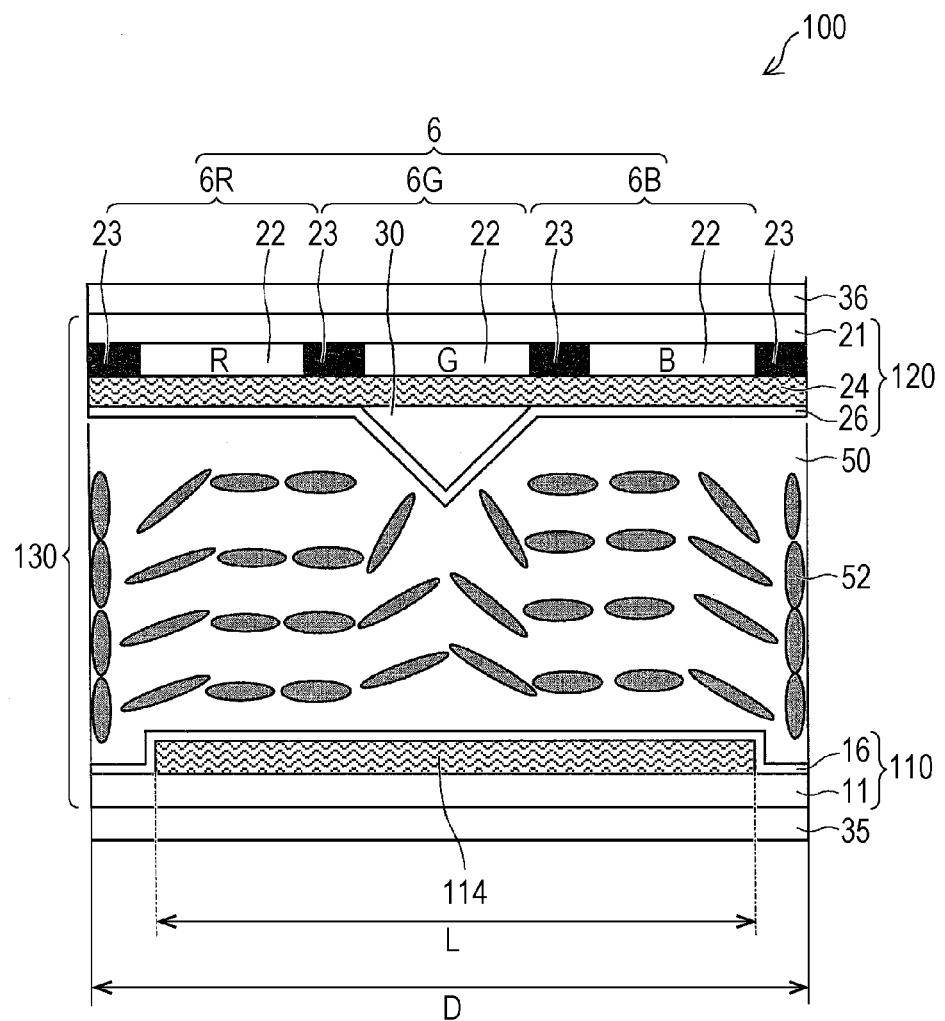
[FIG. 21]

FIG. 21 is a cross sectional view schematically illustrating an outline configuration of a main part of a liquid crystal panel 100 used in comparison.

Initially, as illustrated in FIG. 21, ITO was formed by sputtering on the whole surface of the glass substrate 11, and a pixel electrode 114 with the electrode width L of 56 μm was formed by photolithography.

Next, an alignment film material (product name: JALS-204, made by JSR Corporation, solid content: 5 wt %, type: γ-butyrolactone solution) is coated on the glass substrate 11 by use of spin coating so as to cover the pixel electrode 114. Then, by baking the alignment film material at a temperature of 200° C. for 2 hours, a substrate 110 on which the alignment film 16 which is a vertical alignment film is provided was formed on a surface to be the opposite surface to liquid crystal layer 50.

On the other hand, color filters 22 and black matrices 23 each with a thickness of 1.2 μm were formed by a well-known method on a glass substrate 21. ITO was formed by sputtering on the whole surfaces of the color filters 22 and the black matrices 23. Accordingly, a counter electrode 24 which covers the entire display region of the glass substrate 21 was formed.

Next, acrylic resin was applied by spin coating on the counter electrode 24, and then ribs 30 each with a height of 1.2 μm and a width of 11 μm were formed by photolithography.

After that, an alignment film material (product name: JALS-204, made by JSR Corporation, solid content: 5 wt %, type: γ-butyrolactone solution) is coated by use of spin coating. Then, by baking the alignment film material at a temperature of 200° C. for 2 hours, a substrate 120 on which the alignment film 26 which is a vertical alignment film is provided was formed on a surface to be the opposite surface to the liquid crystal layer 50. The dried-film thickness of the alignment films 16 and 26 thus formed was 1000 Å (=0.1 μm).

Subsequently, a sealing resin (product name: Struct Bond XN-215, made by Mitsui Toatsu Chemicals, Inc) as a sealant was printed on one of the substrates 110 and 120.

Next, the substrates 110 and 120 were combined together to be a pair and then heated at a temperature of 135° C. for 1 hour.

Next, a gap between the pair of substrates 110 and 120 was filled with a positive type liquid crystal material (Δ∈=3, Δn=0.1, made by Merck KGaA) as a liquid crystal material by a vacuum injection method. Thus, a liquid crystal cell 130, in which the liquid crystal layer 50 is sandwiched between the pair of the substrates 110 and 120, was produced.

Next, the polarizers 35 and 36 were attached with a back surface and a front surface of the liquid crystal cell 130 respectively, such that transmission axes of the respective polarizers 35 and 36 are at the right angle to each other. In this way, the liquid crystal panel 100 (liquid crystal display element) illustrated in FIG. 21 was prepared.

(Examination Result)

The following description will discuss the effects of the liquid crystal panel 2 which effects were examined with the use of the liquid crystal panel 100 for comparison.

Color shifting (color change) depending on a viewing angle of the liquid crystal panel (1) of Example 1 and the liquid crystal panel 100 of Comparative Example were examined. The measurement was carried out with the use of an Ez-contrast 160R (manufactured by Eldim Corporation) and with generally-used CCF backlights on which the liquid crystal panels were respectively mounted.

As in the case of the liquid crystal panel (1) of Example 1, the electrode width L of each of the comb-shaped electrodes 14 and 15 (width of each of the tooth electrodes 14A and 15A) was set to 2.5 μm, the inter-distance S between adjacent comb-shaped electrodes 14 and 15 (amount of space between adjacent comb-shaped electrodes 14A and 15A) was set to 7.5 μm, and a pitch D between adjacent comb-shaped electrodes 14 and 15 (distance between a center of a tooth electrode 14A and a center of a tooth electrode 15A, which tooth electrodes 14A and 15A are to be electrodes lines (D=(L+S)/2)) was set to 10 μm. In the liquid crystal panel 100 of Comparative Example, the electrode width L of a pixel electrode was set to 56 μm, the electrode distance S between pixel electrodes was set to 8.0 μm, and the electrode pitch D of a pixel electrode was set to 64 μm.

Then, in each liquid crystal panel, at each location where azimuth θ is 0° and 45°, chromaticity coordinates of R (red), G (green), B (blue), and W (white) when changing the polar angle φ by 15° from 0° to 60° were calculated using CIE color system, and the shifting amounts of the W (white) color were examined.

Figure 4:
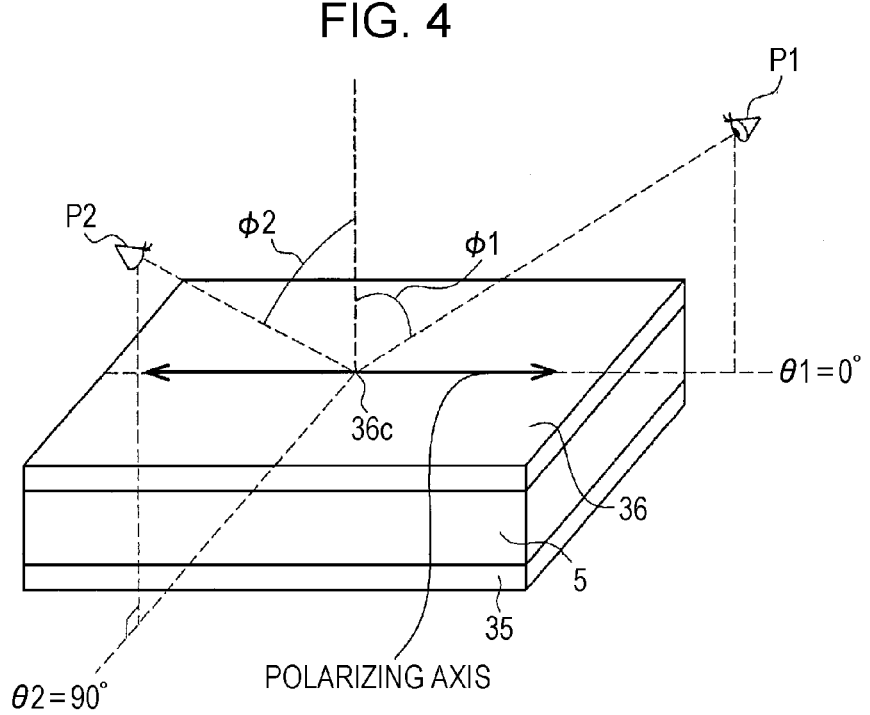
[FIG. 4]
Figure 5:
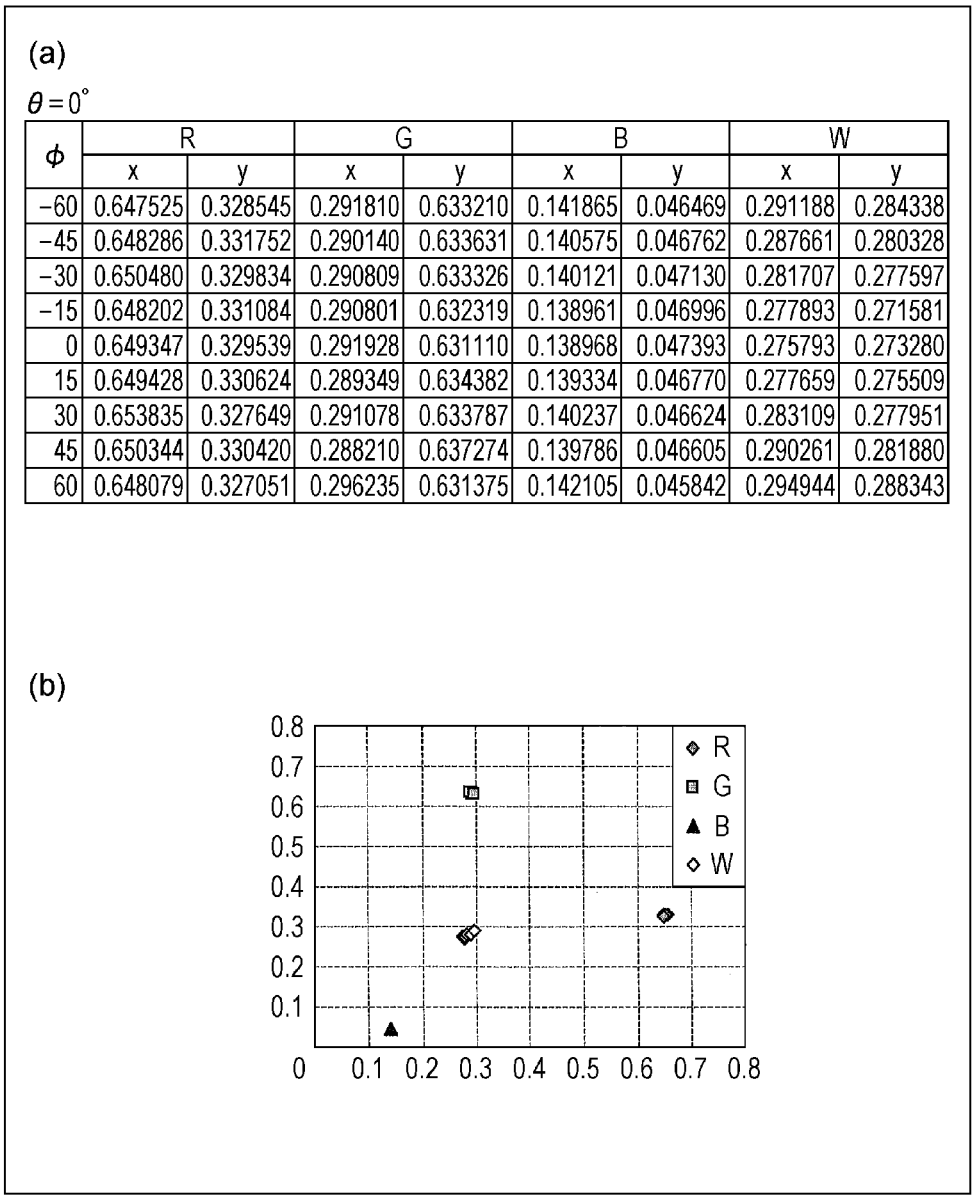
[FIG. 5]
Figure 6:
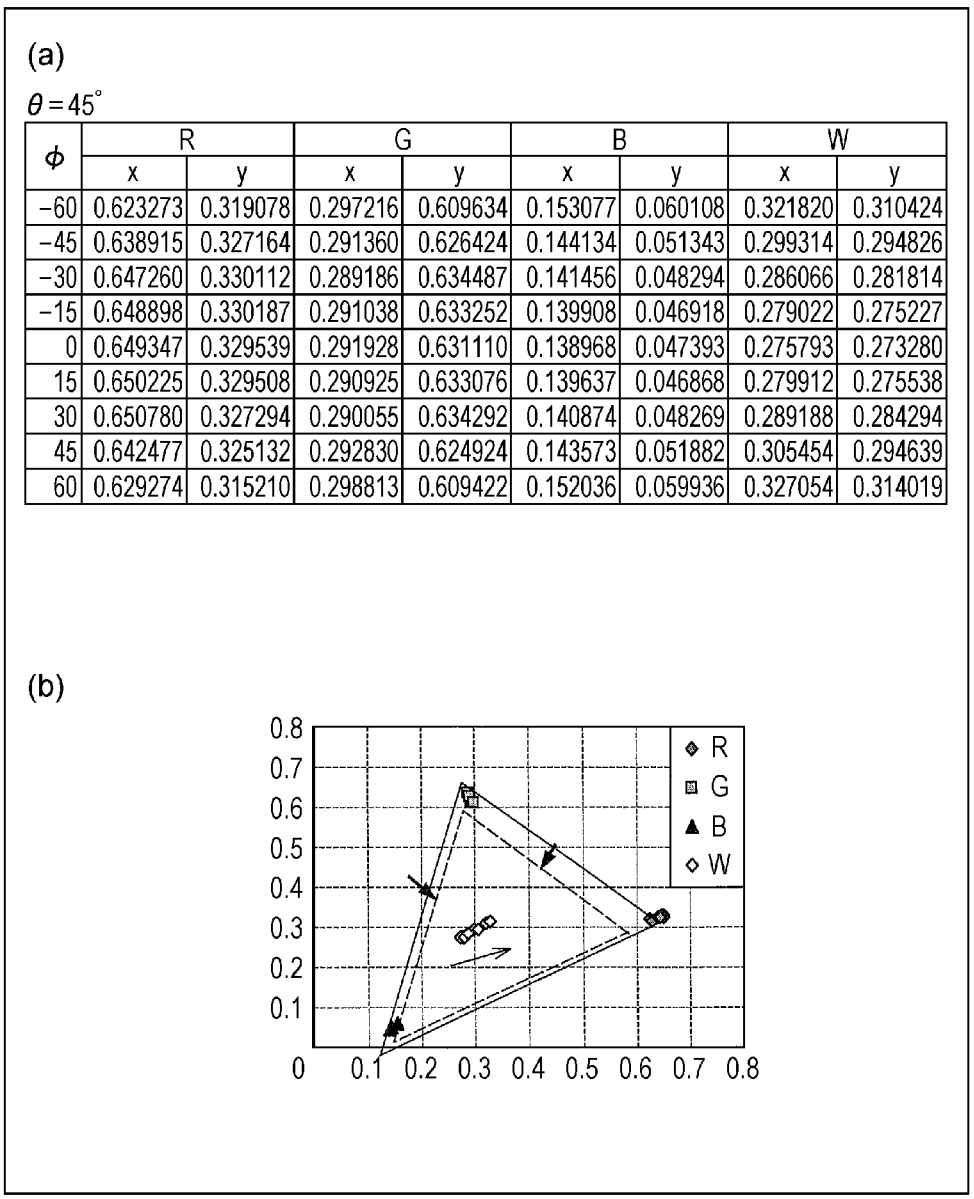
[FIG. 6]
Figure 7:
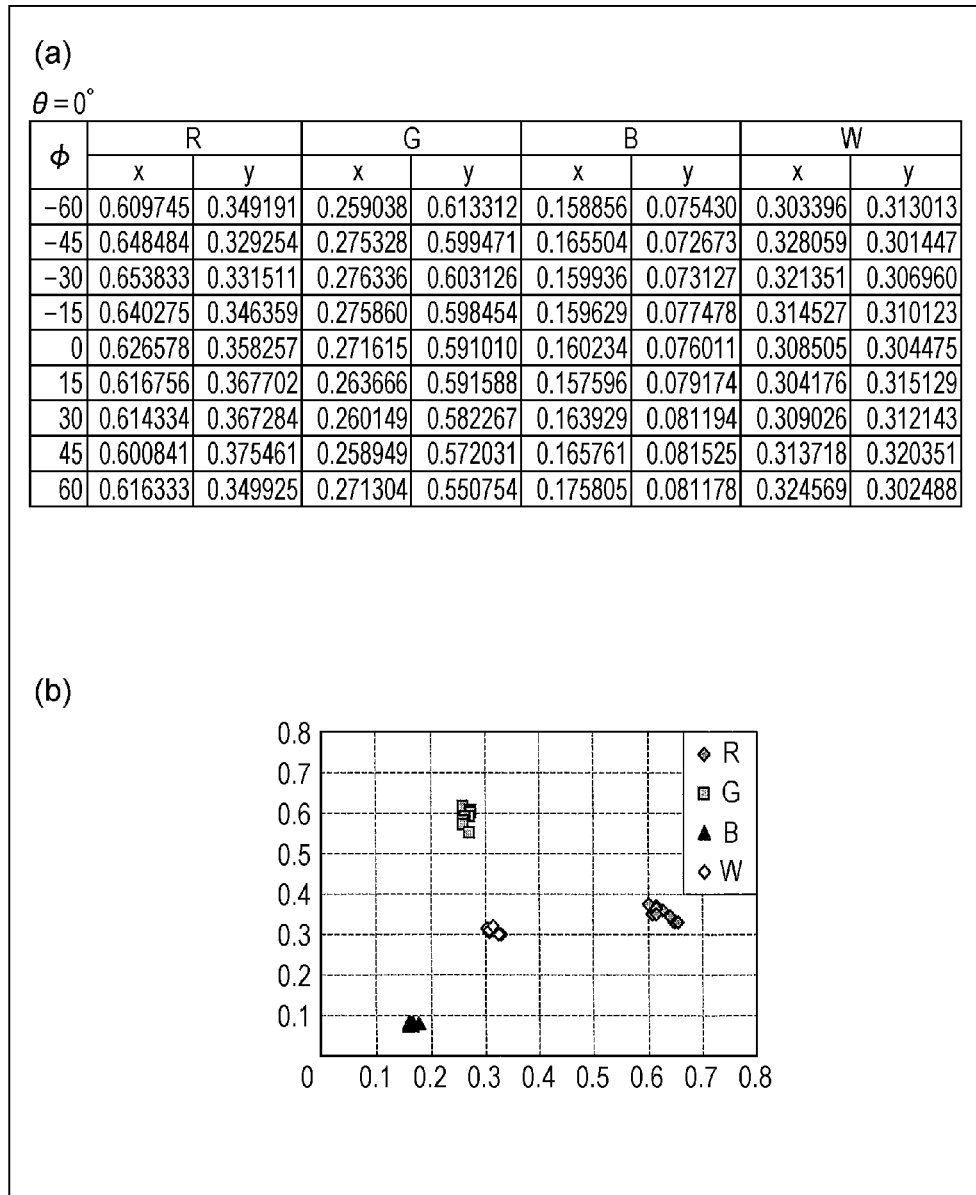
[FIG. 7]
Figure 8:
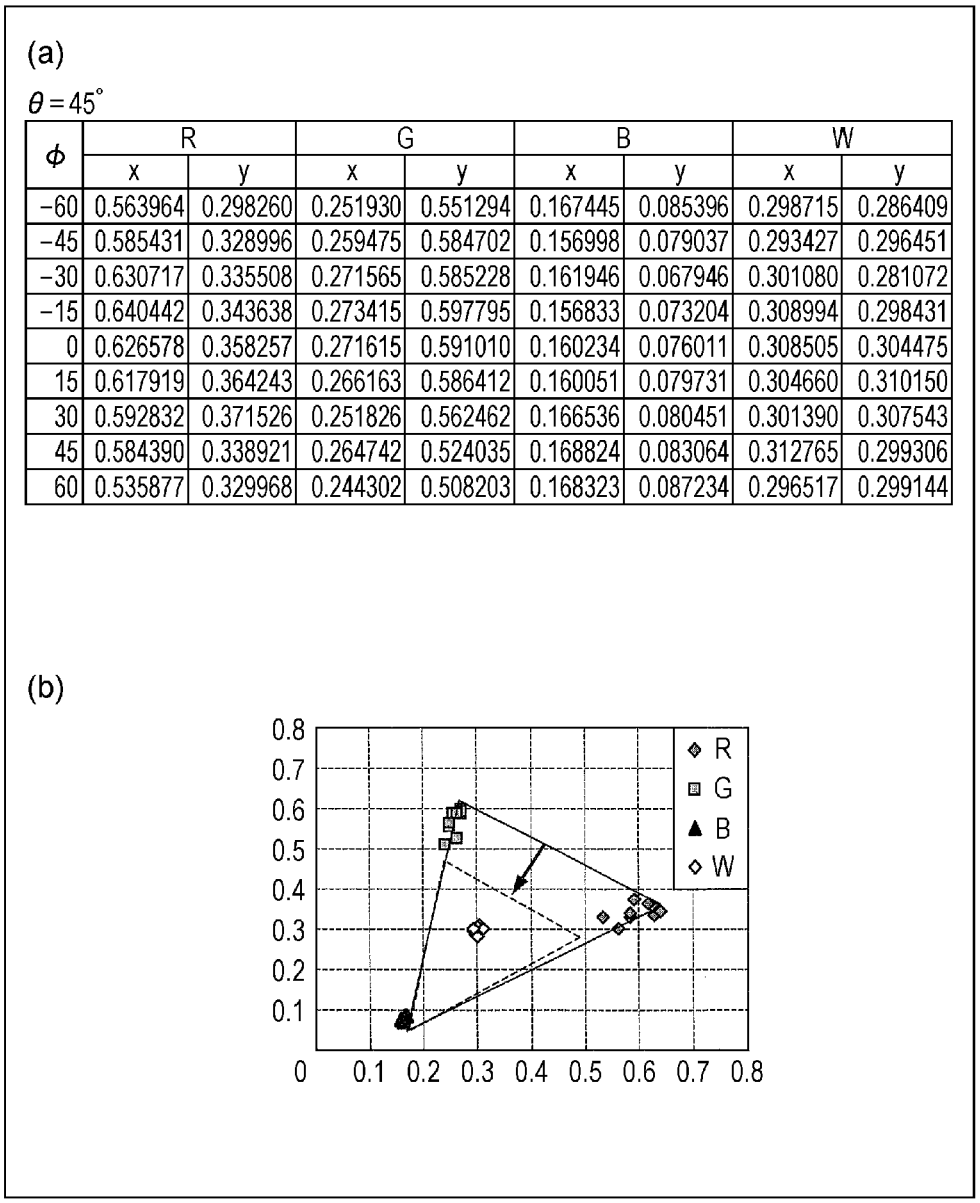
[FIG. 8]

Herein, as shown in FIG. 4, the azimuth θ is a rotation angle in a flat plane of a line connecting foot of a perpendicular lowered to the flat plane including the surface of the polarizer 36 on the liquid crystal panel from an observing point and a center 36c of the polarizer 36. In the example of FIG. 4, an azimuth θ1 of an observing point P1 is 0° (parallel to a polarizing axis), and an azimuth θ2 of an observing point P2 is 90°. In addition, the polar angle φ is an angle formed by a straight line connecting the center 36c of the polarizer 36 on the liquid crystal display panel and the observing point, with a normal line of the polarizer 36. A polar angle of the observing point P1 is shown as φ1, and a polar angle of the observing point P2 is shown as φ2.

FIG. 5(a) shows chromaticity coordinates in a case where the azimuth θ=0° (parallel to the polarizing axis) for the liquid crystal panel 100 of Comparative Example, and FIG. 5(b) shows a CIE view where the values are plotted. As shown in the drawing, at a location to be parallel to the polarizing axis (azimuth θ=0°), it is found that the white color shifting (color change) almost does not occur although the polar angle φ changes from 0° to 60° (−60°).

FIG. 6(a) shows chromaticity coordinates in a case where the azimuth θ=45° (45° with respect to the polarizing axis) for the liquid crystal panel 100 of Comparative Example, and FIG. 6(b) shows a CIE view where the values are plotted. As shown in the drawing, at a location to be 45° with respect to the polarizing axis (azimuth θ=45°), it is found that the white color shifting (color change) almost does not occur although the polar angle φ changes from 0° to 60° (−60°). That is, it is found that the color shifting becomes larger according to the change from 0° of the polar angle φ to 60° (−60°) thereof, and the entire location is tinged with yellow.

On the other hand, FIG. 7(a) shows chromaticity coordinates in a case where the azimuth θ=0° (parallel to the polarizing axis) for the liquid crystal panel (1) of Example 1, and FIG. 7(b) shows a CIE view where the values are plotted. As shown in the drawing, at a location to be parallel to the polarizing axis (azimuth θ=0°), it is found that the white color shifting almost does not occur although the polar angle φ changes from 0° to 60° (−60°) in the same manner as in the liquid crystal panel 100 of Comparative Example.

In addition, FIG. 8(a) shows chromaticity coordinates in a case where the azimuth θ=45° (45° with respect to the polarizing axis) for the liquid crystal panel (1) of Example 1, and FIG. 8(b) shows a CIE view where the values are plotted. As shown in the drawing, even at a location to be 45° with respect to the polarizing axis (azimuth θ=45°), it is found that the white color shifting almost does not occur although the polar angle φ changes from 0° to 60° (−60°).

As described above, in the liquid crystal panel 100 of Comparative Example, at the location to be 45° with respect to the polarizing axis (azimuth θ=45°), if the polarizing angle φ changes from 0° to 60° (−60°), the white color is tinged with yellow according thereto, and meanwhile, in the liquid crystal panel (1) of Example 1, at a location to be 45° with respect to the polarizing axis, it is found that the color shifting does not occur even when the polarizing angle φ changes from 0° to 60° (−60°).

(Shifting Amount of White Color)

Next, the following is an analysis of an actual shifting amount of the white color.

First, color shifting at a location where an azimuth θ is 0° (i.e. parallel to a polarizing axis) will be analyzed. Table 1 shows chromaticity coordinates of the white color in a case where azimuth θ of the liquid crystal panel 100 of Comparative Example is 0° (i.e. parallel to a polarizing axis) (corresponds to W in FIG. 5), and Table 2 shows the shifting amount of the white color (W) calculated based on Table 1.

TABLE 1

| φ | x | y |
|---|---|---|
| −60 | 0.291188 | 0.284338 |
| −45 | 0.287661 | 0.280328 |
| −30 | 0.281707 | 0.277597 |
| −15 | 0.277893 | 0.271581 |
| 0 | 0.275793 | 0.273280 |
| 15 | 0.277659 | 0.275509 |
| 30 | 0.283109 | 0.277951 |
| 45 | 0.290261 | 0.281880 |
| 60 | 0.294944 | 0.288343 |

TABLE 2

| φ | x | y | Shifting amount of W color |
|---|---|---|---|
| 15 | 0.001983 | 0.000265 | 0.002 |
| 30 | 0.006615 | 0.004494 | 0.008 |
| 45 | 0.013168 | 0.007824 | 0.015 |
| 60 | 0.017273 | 0.013060 | 0.022 |

In addition, when the shifting amount is set to a, a shows distance moved with respect to a coordinate (x, y) in a case where the polar angle φ=0°. For example, movement distance ax in an x direction in a case where the polar angle φ=60° is acquired by ((x coordinate when φ=60°)+(x coordinate when φ=−60°))/2−(x coordinate when φ=0°), and in the same manner, movement distance ay in a y direction in a case where the polar angle φ=60° is acquired by ((y coordinate when φ=60°)+(y coordinate when φ=−60°)/2−(y coordinate when φ=0°). Accordingly, the shifting amount a is acquired by $((ax)^2+(ay)^2)^{(1/2)}$.

Table 3 indicates chromaticity coordinates in a case where an azimuth θ of the liquid crystal panel (1) of Example 1 is 0° (i.e. parallel to a polarizing axis) (corresponds to W in FIG. 7), Table 4 indicates shifting amounts of the white color (W) which are calculated based on Table 3.

TABLE 3

| φ | x | y |
|---|---|---|
| −60 | 0.303396 | 0.313013 |
| −45 | 0.328059 | 0.301447 |
| −30 | 0.321351 | 0.306960 |
| −15 | 0.314527 | 0.310123 |
| 0 | 0.308505 | 0.304475 |
| 15 | 0.304176 | 0.315129 |
| 30 | 0.309026 | 0.312143 |
| 45 | 0.313718 | 0.320351 |
| 60 | 0.324569 | 0.302488 |

TABLE 4

| φ | x | y | Shifting amount of W color |
|---|---|---|---|
| 15 | 0.000847 | 0.008151 | 0.008 |
| 30 | 0.006684 | 0.005077 | 0.008 |
| 45 | 0.012384 | 0.006424 | 0.014 |
| 60 | 0.005478 | 0.003275 | 0.006 |

Figure 9:
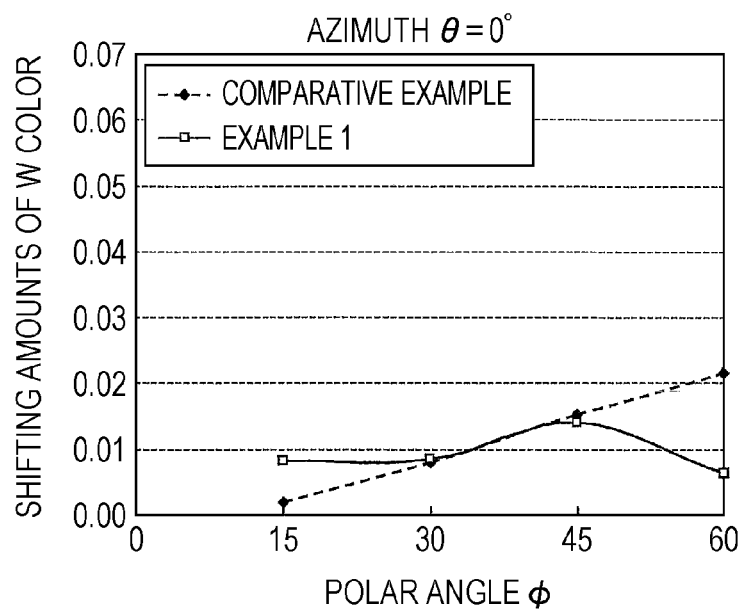
[FIG. 9] IG. 9 is a graph in which the shifting amounts of Table 2 and Table 4 are plotted.

FIG. 9 is a graph in which the shifting amounts of the white color (W) of Table 2 and Table 4 are plotted. As shown in the drawing, in a case where the azimuth θ is 0°, the maximum shifting amount in the liquid crystal display panel 100 of Comparative Example was 0.022, and the maximum shifting amount in the liquid crystal display panel (1) of Example 1 was 0.014. It is found that both shifting amounts are slight and large color shifting did not occur. That is, in a level to be visually recognized, the white color is not seen to be tinged with yellow.

Next, the following is an analysis of color shifting at a location where the azimuth θ is 45° (45° with respect to the polarizing axis). Table 5 shows chromaticity coordinates of the white color in a case where azimuth θ of the liquid crystal panel 100 of Comparative Example is 45° (i.e. 45° with respect to a polarizing axis) (corresponds to W in FIG. 6), and Table 6 shows the shifting amount of the white color (W) calculated based on Table 5.

TABLE 5

| φ | x | Y |
|---|---|---|
| −60 | 0.321820 | 0.310424 |
| −45 | 0.299314 | 0.294826 |
| −30 | 0.286066 | 0.281814 |
| −15 | 0.279022 | 0.275227 |
| 0 | 0.275793 | 0.273280 |
| 15 | 0.279912 | 0.275538 |
| 30 | 0.289188 | 0.284294 |
| 45 | 0.305454 | 0.294639 |
| 60 | 0.327054 | 0.314019 |

TABLE 6

| φ | x | y | Shifting amount of W color |
|---|---|---|---|
| 15 | 0.003674 | 0.002103 | 0.004 |
| 30 | 0.011834 | 0.009774 | 0.015 |
| 45 | 0.026591 | 0.021452 | 0.034 |
| 60 | 0.048644 | 0.038941 | 0.062 |

Table 7 indicates chromaticity coordinates in a case where the azimuth θ of the liquid crystal panel (1) of Example 1 is 45° (45° with respect to the polarizing axis) (corresponds to W in FIG. 8), and Table 8 indicates shifting amounts of the white color (W) calculated based on Table 7.

TABLE 7

| φ | x | y |
|---|---|---|
| −60 | 0.298715 | 0.286409 |
| −45 | 0.293427 | 0.296451 |
| −30 | 0.301080 | 0.281072 |
| −15 | 0.308994 | 0.298431 |
| 0 | 0.308505 | 0.304475 |
| 15 | 0.304660 | 0.310150 |
| 30 | 0.301390 | 0.307543 |
| 45 | 0.312765 | 0.299306 |
| 60 | 0.296517 | 0.299144 |

TABLE 8

| φ | x | y | Shifting amount of W color |
|---|---|---|---|
| 15 | −0.001678 | −0.000185 | 0.002 |
| 30 | −0.007270 | −0.010168 | 0.012 |
| 45 | −0.005409 | −0.006597 | 0.009 |
| 60 | −0.010888 | −0.011699 | 0.016 |

Figure 10:
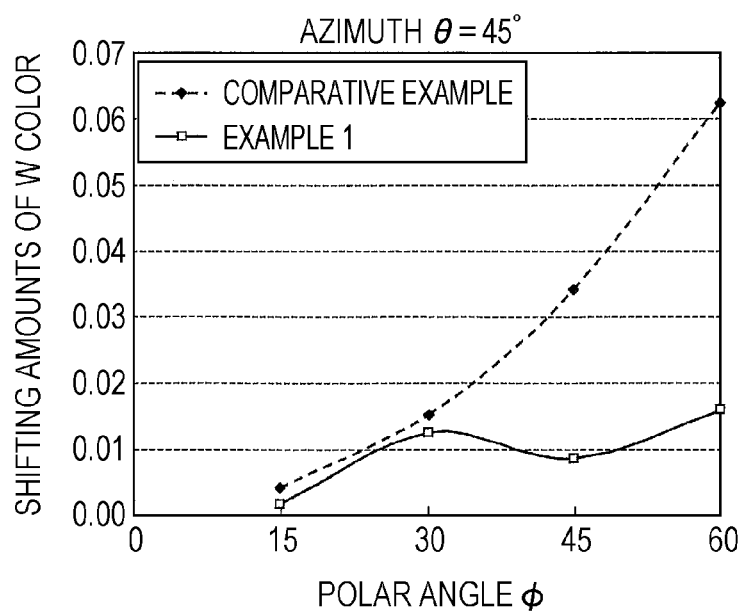
[FIG. 10]

FIG. 10 is a graph in which the shifting amounts of Table 6 and Table 8 are plotted. As shown in the drawing, in a case where the azimuth θ is 45°, the maximum shifting amount in the liquid crystal display panel (1) of Example 1 was 0.016 while the maximum shifting amount in the liquid crystal display panel 100 of Comparative Example was 0.062. It is found that the shifting amount is large in the liquid crystal panel 100 of Comparative Example and significant color shifting occurred. That is, as the polar angle φ with respect to the liquid crystal panel becomes large, the problem in that the white color is seen to be tinged with yellow occurs. On the other hand, the shifting amount in the liquid crystal panel (1) of Example 1 is substantially the same as in a case where the azimuth θ is 0° (maximum shifting amount=0.014), it is found that even when the polar angle φ becomes large, the significant color shifting does not occur. Accordingly, it is found that the color shifting can be suppressed with the configuration of the liquid crystal panel (1) of Example 1.

(Diffraction Efficiency)

The inventors of the present invention paid attention to functions as diffraction grating configured by electrodes and spaces between the electrodes to find the factors of the color shifting described above. A relationship between the electrode pitch D and color shifting was investigated.

First, verification was performed for the relationship between the diffraction efficiency (transmission efficiency) and the electrode pitch D when transmission with the diffraction grating. Herein, a plurality of electrode pitches D were set, and diffraction efficiency (transmission efficiency) of light in each electrode pitch D was measured by changing wavelengths of light at four levels with the polar angle φ of 0°, 10°, 20° and 30° which are assumed incident angle to the liquid crystal layer. In addition, the following equation was used for the calculation of the diffraction efficiency.

$$\eta = \sin 2(\pi \Delta n d / (\lambda \cos \theta))$$

Figure 11:
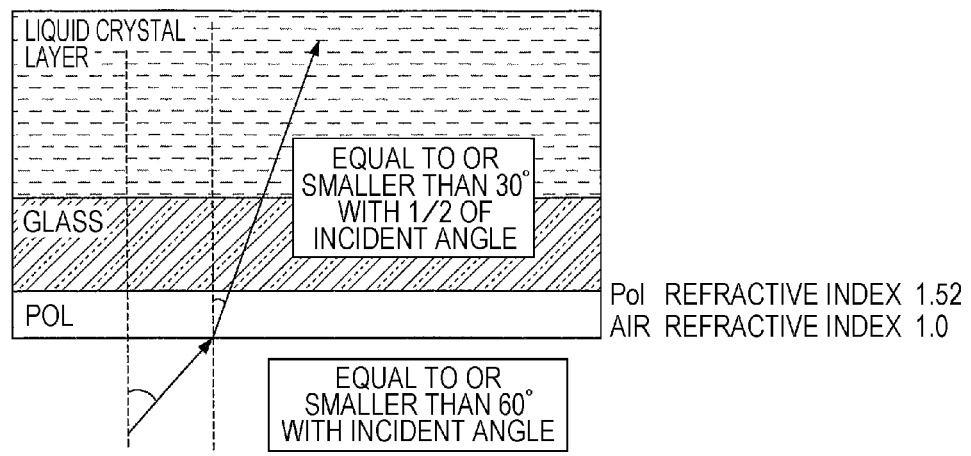
[FIG. 11]

In the above equation, λ indicates an incident wavelength. Δn was calculated as an average refractive index which is felt by incident polarized light for the polarized light to be incident with azimuth orientation of 45° in Δn of the electrode (ON/OFF of liquid crystal) in FIG. 11, and herein, Δn=0.05 was used. θ is an incident angle which enters in the liquid crystal layer through the polarizer (glass) from the backlight, and is substantially 1/2 in the liquid crystal layer with respect to the incident angle from the space.

Table 9 shows diffraction efficiencies when the electrode pitches D are 4 μm, 5 μm, and 6 μm, Table 10 shows diffraction efficiencies when the electrode pitches D are 8 μm, 10 μm, and 11 μm, and Table 11 shows diffraction efficiencies when the electrode pitches D are 12 μm, 14 μm, and 64 μm. In addition, the case where the electrode pitch D is 10 μm corresponds to the liquid crystal panel (1) of Example 1, and the case where the electrode pitch D is 64 μm corresponds to the liquid crystal panel 100 of Comparative Example.

TABLE 9

| | D | | | | | | | | | | | |
|---|---|---|---|---|---|---|---|---|---|---|---|---|
| | 4 μm | | | | 5 μm | | | | 6 μm | | | |
| | φ | | | | | | | | | | | |
| nm | 0 | 10 | 20 | 30 | 0 | 10 | 20 | 30 | 0 | 10 | 20 | 30 |
| 400 | 95% | 95% | 98% | 100% | 99% | 98% | 96% | 88% | 73% | 70% | 60% | 41% |
| 410 | 93% | 94% | 97% | 100% | 100% | 99% | 97% | 91% | 77% | 74% | 65% | 47% |
| 420 | 91% | 92% | 95% | 99% | 100% | 100% | 99% | 93% | 81% | 79% | 70% | 52% |
| 430 | 90% | 91% | 94% | 98% | 100% | 100% | 99% | 95% | 85% | 82% | 75% | 58% |
| 440 | 88% | 89% | 92% | 97% | 100% | 100% | 100% | 97% | 88% | 86% | 79% | 63% |
| 450 | 86% | 87% | 91% | 96% | 99% | 100% | 100% | 98% | 90% | 89% | 82% | 68% |
| 460 | 84% | 85% | 89% | 95% | 99% | 99% | 100% | 99% | 93% | 91% | 85% | 72% |
| 470 | 82% | 84% | 87% | 93% | 98% | 98% | 100% | 100% | 95% | 93% | 88% | 76% |
| 480 | 80% | 82% | 86% | 92% | 97% | 98% | 99% | 100% | 96% | 95% | 91% | 80% |
| 490 | 79% | 80% | 84% | 91% | 96% | 97% | 99% | 100% | 97% | 97% | 93% | 83% |
| 500 | 77% | 78% | 82% | 89% | 95% | 95% | 98% | 100% | 98% | 98% | 95% | 86% |
| 510 | 75% | 76% | 81% | 87% | 93% | 94% | 97% | 100% | 99% | 99% | 96% | 88% |
| 520 | 73% | 75% | 79% | 86% | 92% | 93% | 96% | 99% | 100% | 99% | 97% | 91% |
| 530 | 72% | 73% | 77% | 84% | 91% | 92% | 95% | 99% | 100% | 100% | 98% | 93% |
| 540 | 70% | 71% | 75% | 83% | 89% | 90% | 94% | 98% | 100% | 100% | 99% | 94% |
| 550 | 68% | 70% | 74% | 81% | 88% | 89% | 92% | 97% | 100% | 100% | 100% | 96% |
| 560 | 67% | 68% | 72% | 80% | 86% | 88% | 91% | 96% | 100% | 100% | 100% | 97% |
| 570 | 65% | 66% | 71% | 78% | 85% | 86% | 90% | 95% | 99% | 100% | 100% | 98% |
| 580 | 63% | 65% | 69% | 76% | 83% | 85% | 89% | 94% | 99% | 99% | 100% | 99% |
| 590 | 62% | 63% | 67% | 75% | 82% | 83% | 87% | 93% | 98% | 99% | 100% | 99% |
| 600 | 60% | 62% | 66% | 73% | 80% | 82% | 86% | 92% | 98% | 98% | 100% | 100% |
| 610 | 59% | 60% | 64% | 72% | 79% | 80% | 84% | 91% | 97% | 97% | 99% | 100% |
| 620 | 58% | 59% | 63% | 70% | 78% | 79% | 83% | 90% | 96% | 97% | 99% | 100% |
| 630 | 56% | 58% | 62% | 69% | 76% | 77% | 82% | 88% | 95% | 96% | 98% | 100% |
| 640 | 55% | 56% | 60% | 67% | 75% | 76% | 80% | 87% | 94% | 95% | 97% | 100% |
| 650 | 54% | 55% | 59% | 66% | 73% | 75% | 79% | 86% | 93% | 94% | 97% | 100% |
| 660 | 52% | 54% | 58% | 65% | 72% | 73% | 77% | 85% | 92% | 93% | 96% | 99% |
| 670 | 51% | 52% | 56% | 63% | 70% | 72% | 76% | 83% | 91% | 92% | 95% | 99% |
| 680 | 50% | 51% | 55% | 62% | 69% | 71% | 75% | 82% | 90% | 91% | 94% | 98% |
| 690 | 49% | 50% | 54% | 61% | 68% | 69% | 73% | 81% | 89% | 90% | 93% | 98% |
| 700 | 48% | 49% | 53% | 60% | 67% | 68% | 72% | 80% | 88% | 89% | 92% | 97% |
| 710 | 47% | 48% | 52% | 58% | 65% | 67% | 71% | 78% | 87% | 88% | 91% | 96% |
| 720 | 46% | 47% | 50% | 57% | 64% | 65% | 70% | 77% | 85% | 87% | 90% | 96% |
| 730 | 45% | 46% | 49% | 56% | 63% | 64% | 68% | 76% | 84% | 85% | 89% | 95% |

TABLE 10

| | D | | | | | | | | | | | |
|---|---|---|---|---|---|---|---|---|---|---|---|---|
| | 8 μm | | | | 10 μm (Example 1) | | | | 11 μm | | | |
| | φ | | | | | | | | | | | |
| nm | 0 | 10 | 20 | 30 | 0 | 10 | 20 | 30 | 0 | 10 | 20 | 30 |
| 400 | 10% | 7% | 2% | 2% | 15% | 19% | 34% | 43% | 26% | 31% | 48% | 79% |
| 410 | 14% | 11% | 4% | 0% | 9% | 12% | 25% | 34% | 18% | 23% | 39% | 70% |
| 420 | 19% | 16% | 7% | 0% | 5% | 7% | 18% | 25% | 12% | 16% | 30% | 61% |
| 430 | 24% | 21% | 11% | 1% | 2% | 4% | 12% | 18% | 7% | 10% | 22% | 52% |
| 440 | 29% | 26% | 16% | 3% | 1% | 1% | 8% | 13% | 4% | 6% | 16% | 43% |
| 450 | 35% | 31% | 20% | 6% | 0% | 0% | 4% | 8% | 1% | 3% | 11% | 34% |
| 460 | 40% | 36% | 25% | 9% | 0% | 0% | 2% | 4% | 0% | 1% | 6% | 27% |
| 470 | 45% | 41% | 30% | 13% | 2% | 1% | 0% | 2% | 0% | 0% | 3% | 20% |
| 480 | 50% | 46% | 35% | 17% | 4% | 2% | 0% | 0% | 1% | 0% | 1% | 15% |
| 490 | 55% | 51% | 40% | 21% | 6% | 4% | 1% | 0% | 2% | 1% | 0% | 10% |
| 500 | 59% | 56% | 45% | 26% | 10% | 7% | 2% | 0% | 4% | 3% | 0% | 6% |
| 510 | 64% | 60% | 50% | 30% | 13% | 10% | 4% | 1% | 7% | 5% | 1% | 3% |
| 520 | 68% | 65% | 54% | 35% | 17% | 14% | 6% | 3% | 10% | 7% | 2% | 1% |
| 530 | 72% | 68% | 58% | 39% | 21% | 18% | 9% | 5% | 13% | 10% | 4% | 0% |
| 540 | 75% | 72% | 63% | 44% | 25% | 22% | 12% | 8% | 17% | 14% | 6% | 0% |
| 550 | 78% | 76% | 66% | 48% | 29% | 26% | 16% | 11% | 21% | 17% | 9% | 0% |
| 560 | 81% | 79% | 70% | 52% | 33% | 30% | 19% | 14% | 25% | 21% | 12% | 1% |
| 570 | 84% | 82% | 74% | 56% | 38% | 34% | 23% | 18% | 29% | 25% | 15% | 3% |
| 580 | 86% | 84% | 77% | 60% | 42% | 38% | 27% | 22% | 33% | 29% | 19% | 5% |
| 590 | 88% | 87% | 80% | 64% | 46% | 42% | 31% | 25% | 37% | 33% | 22% | 7% |
| 600 | 90% | 89% | 82% | 68% | 50% | 46% | 35% | 29% | 41% | 37% | 26% | 10% |
| 610 | 92% | 91% | 85% | 71% | 54% | 50% | 39% | 33% | 45% | 41% | 30% | 13% |
| 620 | 94% | 92% | 87% | 74% | 58% | 54% | 43% | 37% | 49% | 45% | 34% | 16% |

TABLE 10-continued

| | D | | | | | | | | | | | |
|---|---|---|---|---|---|---|---|---|---|---|---|---|
| | 8 μm | | | | 10 μm (Example 1) | | | | 11 μm | | | |
| | φ | | | | | | | | | | | |
| nm | 0 | 10 | 20 | 30 | 0 | 10 | 20 | 30 | 0 | 10 | 20 | 30 |
| 630 | 95% | 94% | 89% | 77% | 61% | 58% | 47% | 41% | 52% | 49% | 38% | 19% |
| 640 | 96% | 95% | 91% | 80% | 65% | 61% | 51% | 45% | 56% | 53% | 41% | 22% |
| 650 | 97% | 96% | 92% | 82% | 68% | 65% | 54% | 48% | 60% | 56% | 45% | 26% |
| 660 | 98% | 97% | 94% | 84% | 71% | 68% | 58% | 52% | 63% | 60% | 49% | 29% |
| 670 | 99% | 98% | 95% | 86% | 74% | 71% | 61% | 55% | 66% | 63% | 52% | 33% |
| 680 | 99% | 99% | 96% | 88% | 76% | 74% | 64% | 59% | 69% | 66% | 56% | 36% |
| 690 | 100% | 99% | 97% | 90% | 79% | 76% | 67% | 62% | 72% | 69% | 59% | 40% |
| 700 | 100% | 100% | 98% | 92% | 81% | 79% | 70% | 65% | 75% | 72% | 62% | 43% |
| 710 | 100% | 100% | 98% | 93% | 83% | 81% | 73% | 68% | 77% | 74% | 65% | 47% |
| 720 | 100% | 100% | 99% | 94% | 85% | 83% | 75% | 71% | 80% | 77% | 68% | 50% |
| 730 | 100% | 100% | 99% | 95% | 87% | 85% | 78% | 73% | 82% | 79% | 71% | 53% |

TABLE 11

| | D | | | | | | | | | | | |
|---|---|---|---|---|---|---|---|---|---|---|---|---|
| | 12 μm | | | | 14 μm | | | | 64 μm (Comparative Example) | | | |
| | φ | | | | | | | | | | | |
| nm | 0 | 10 | 20 | 30 | 0 | 10 | 20 | 30 | 0 | 10 | 20 | 30 |
| 400 | 79% | 84% | 96% | 97% | 95% | 91% | 72% | 29% | 35% | 69% | 76% | 70% |
| 410 | 70% | 76% | 91% | 100% | 99% | 96% | 83% | 42% | 1% | 16% | 99% | 12% |
| 420 | 61% | 67% | 84% | 100% | 100% | 99% | 91% | 56% | 19% | 1% | 65% | 6% |
| 430 | 52% | 58% | 76% | 98% | 99% | 100% | 97% | 68% | 66% | 34% | 15% | 55% |
| 440 | 43% | 49% | 67% | 93% | 95% | 98% | 99% | 79% | 98% | 80% | 1% | 97% |
| 450 | 35% | 40% | 58% | 88% | 90% | 94% | 100% | 87% | 90% | 100% | 31% | 89% |
| 460 | 27% | 32% | 50% | 81% | 84% | 89% | 98% | 94% | 53% | 81% | 76% | 44% |
| 470 | 20% | 25% | 41% | 73% | 77% | 82% | 95% | 98% | 15% | 41% | 100% | 6% |
| 480 | 15% | 19% | 34% | 65% | 69% | 75% | 90% | 100% | 0% | 8% | 88% | 5% |
| 490 | 10% | 13% | 27% | 57% | 61% | 67% | 84% | 100% | 14% | 1% | 51% | 39% |
| 500 | 6% | 9% | 20% | 49% | 53% | 59% | 77% | 98% | 47% | 21% | 16% | 79% |
| 510 | 3% | 5% | 15% | 41% | 45% | 51% | 70% | 95% | 80% | 55% | 0% | 100% |
| 520 | 1% | 3% | 11% | 34% | 38% | 44% | 62% | 90% | 99% | 86% | 11% | 90% |
| 530 | 0% | 1% | 7% | 28% | 31% | 37% | 55% | 85% | 96% | 100% | 40% | 58% |
| 540 | 0% | 0% | 4% | 22% | 25% | 30% | 47% | 79% | 75% | 93% | 73% | 23% |
| 550 | 0% | 0% | 2% | 17% | 19% | 24% | 40% | 72% | 46% | 70% | 95% | 2% |
| 560 | 1% | 0% | 1% | 12% | 15% | 19% | 34% | 65% | 19% | 41% | 99% | 4% |
| 570 | 3% | 1% | 0% | 8% | 11% | 14% | 28% | 58% | 3% | 16% | 86% | 25% |
| 580 | 5% | 3% | 0% | 5% | 7% | 10% | 22% | 51% | 1% | 2% | 61% | 55% |
| 590 | 7% | 5% | 1% | 3% | 4% | 7% | 17% | 45% | 13% | 2% | 33% | 83% |
| 600 | 10% | 7% | 2% | 2% | 2% | 4% | 13% | 38% | 35% | 15% | 11% | 98% |
| 610 | 12% | 10% | 3% | 0% | 1% | 2% | 9% | 32% | 59% | 36% | 1% | 98% |
| 620 | 16% | 13% | 5% | 0% | 0% | 1% | 6% | 27% | 81% | 60% | 3% | 83% |
| 630 | 19% | 16% | 7% | 0% | 0% | 0% | 4% | 22% | 95% | 81% | 17% | 59% |
| 640 | 22% | 19% | 10% | 1% | 0% | 0% | 2% | 17% | 100% | 95% | 38% | 33% |
| 650 | 26% | 22% | 13% | 2% | 1% | 0% | 1% | 13% | 95% | 100% | 61% | 13% |
| 660 | 29% | 26% | 16% | 3% | 2% | 1% | 0% | 10% | 83% | 95% | 81% | 1% |
| 670 | 33% | 29% | 19% | 5% | 3% | 2% | 0% | 7% | 65% | 83% | 95% | 1% |
| 680 | 36% | 33% | 22% | 7% | 5% | 3% | 0% | 5% | 45% | 66% | 100% | 11% |
| 690 | 40% | 36% | 25% | 9% | 7% | 5% | 1% | 3% | 27% | 46% | 97% | 29% |
| 700 | 43% | 40% | 28% | 11% | 10% | 7% | 2% | 2% | 12% | 28% | 86% | 50% |
| 710 | 47% | 43% | 32% | 14% | 12% | 9% | 3% | 1% | 3% | 13% | 70% | 70% |
| 720 | 50% | 46% | 35% | 17% | 15% | 12% | 5% | 0% | 0% | 4% | 52% | 87% |
| 730 | 53% | 50% | 38% | 20% | 17% | 14% | 6% | 0% | 3% | 0% | 34% | 97% |

As shown in Tables 9 to 11, it is found that, in a region where the electrode pitches D are 6 μm to 10 μm, the diffraction efficiencies of light becomes higher as the wavelength becomes larger. This means that light of the wavelengths of R color and G color diffracts more than B color.

Next, the diffraction efficiencies with respect to spectral wavelength in Sim were calculated. Herein, the wavelength of R color was set to be 650 nm, the wavelength of G color was set to be 550 nm, and the wavelength of B color was set to be 450 nm. (a), (b), and (c) of FIG. 12 correspond to the electrode pitch D of 4 μm, 5 μm, and 6 μm of Table 9, respectively, (a), (b), and (c) of FIG. 13 correspond to the electrode pitch D of 8 μm, 10 μm, and 11 μm of Table 10, respectively, and (a), (b), and (c) of FIG. 14 correspond to the electrode pitch D of 12 μm, 14 μm, and 64 μm of Table 11, respectively. As understood from the graphs, in a region where the electrode pitch D is 6 μm to 10 μm, the optical diffraction efficiency becomes higher as the wavelength becomes larger, and it can be said that the light of R color and G color diffracts more than B color.

Next, shifting amounts of each color (R color, G color, B color, and W color) will be investigated.

Table 12 shows shifting amounts of R color which are calculated, based on chromaticity coordinates of R color (corresponds to R in FIG. 6) for a case where an azimuth θ of the liquid crystal panel 100 of Comparative Example is 45° (i.e. 45° with respect to a polarizing axis). In addition, Table 13 shows shifting amounts of G color which are calculated, based on chromaticity coordinates of G color (corresponds to G in FIG. 6) for a case where an azimuth θ of the liquid crystal panel 100 of Comparative Example is 45°. In addition, Table 14 shows shifting amounts of B color which are calculated, based on chromaticity coordinates of B color (corresponds to B in FIG. 6) for a case where an azimuth θ of the liquid crystal panel 100 of Comparative Example is 45°.

TABLE 12

| φ | x | Y | Shifting amount of R color |
|---|---|---|---|
| 15 | 0.000215 | 0.000309 | 0.000 |
| 30 | −0.000326 | −0.000836 | 0.001 |
| 45 | −0.008651 | −0.003391 | 0.009 |
| 60 | −0.023073 | −0.012395 | 0.026 |

TABLE 13

| φ | x | y | Shifting amount of G color |
|---|---|---|---|
| 15 | −0.000946 | 0.002054 | 0.002 |
| 30 | −0.002307 | 0.003280 | 0.004 |
| 45 | 0.000167 | −0.005436 | 0.005 |
| 60 | 0.006087 | −0.021581 | 0.022 |

TABLE 14

| φ | x | y | Shifting amount of B color |
|---|---|---|---|
| 15 | 0.000804 | −0.000500 | 0.001 |
| 30 | 0.002197 | 0.000888 | 0.002 |
| 45 | 0.004885 | 0.004219 | 0.006 |
| 60 | 0.013588 | 0.012629 | 0.019 |

Figure 15:
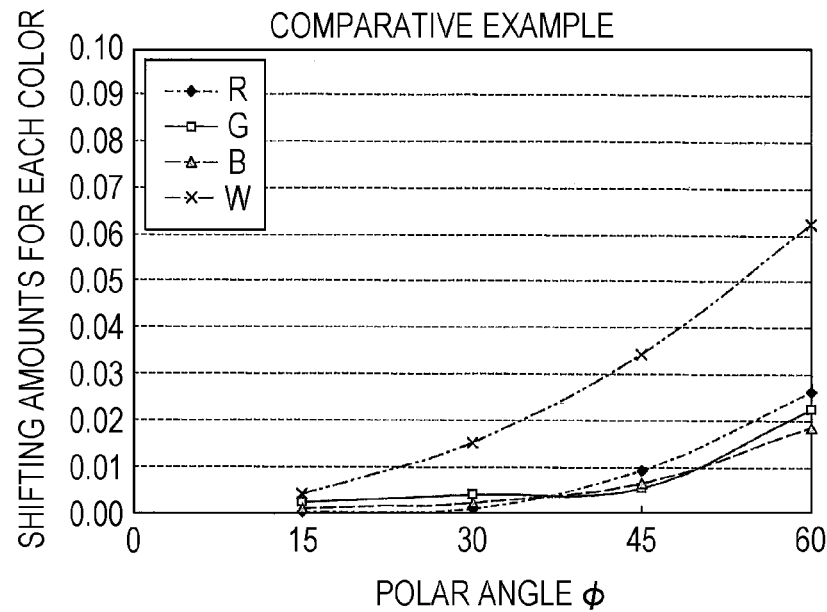
[FIG. 15]

FIG. 15 is a graph showing a relationship between shifting amounts of the R color, the G color, the B color, and the W color (correspond to Table 12, Table 13, Table 14, and Table 6, respectively) and the polar angles φ in a case where the azimuth θ of the liquid crystal panel 100 of Comparative Example is 45°. As shown in the drawing, it is found that each color shifting of the R color, the G color, and the B color changes in the same manner, and only the shifting amount of the W color significantly changes, according to the change from 0° of the polar angle φ to 60° (−60° thereof.

Meanwhile, Table 15 shows shifting amounts of R color calculated, based on chromaticity coordinates of the R color (corresponds to R in FIG. 8) for a case where an azimuth θ of the liquid crystal panel (1) of Example 1 is 45° (45° with respect to the polarizing axis). In addition, Table 16 shows shifting amounts of G color calculated, based on chromaticity coordinates of the G color (corresponds to G in FIG. 8) for a case where an azimuth θ of the liquid crystal panel (1) of Example 1 is 45°. In addition, Table 17 shows shifting amounts of B color calculated, based on chromaticity coordinates of the B color (corresponds to B in FIG. 8) for a case where an azimuth θ of the liquid crystal panel (1) of Example 1 is 45°.

TABLE 15

| φ | x | y | Shifting amount of R color |
|---|---|---|---|
| 15 | 0.002602 | −0.004317 | 0.005 |
| 30 | −0.014804 | −0.004740 | 0.016 |
| 45 | −0.041668 | −0.024299 | 0.048 |
| 60 | −0.076658 | −0.044143 | 0.088 |

TABLE 16

| φ | x | y | Shifting amount of G color |
|---|---|---|---|
| 15 | −0.001826 | 0.001093 | 0.002 |
| 30 | −0.009920 | −0.017165 | 0.020 |
| 45 | −0.009507 | −0.036642 | 0.038 |
| 60 | −0.023499 | −0.061262 | 0.066 |

TABLE 17

| φ | x | y | Shifting amount of B color |
|---|---|---|---|
| 15 | −0.001792 | 0.000456 | 0.002 |
| 30 | 0.004007 | −0.001813 | 0.004 |
| 45 | 0.002677 | 0.005040 | 0.006 |
| 60 | 0.007649 | 0.010304 | 0.013 |

Figure 16:
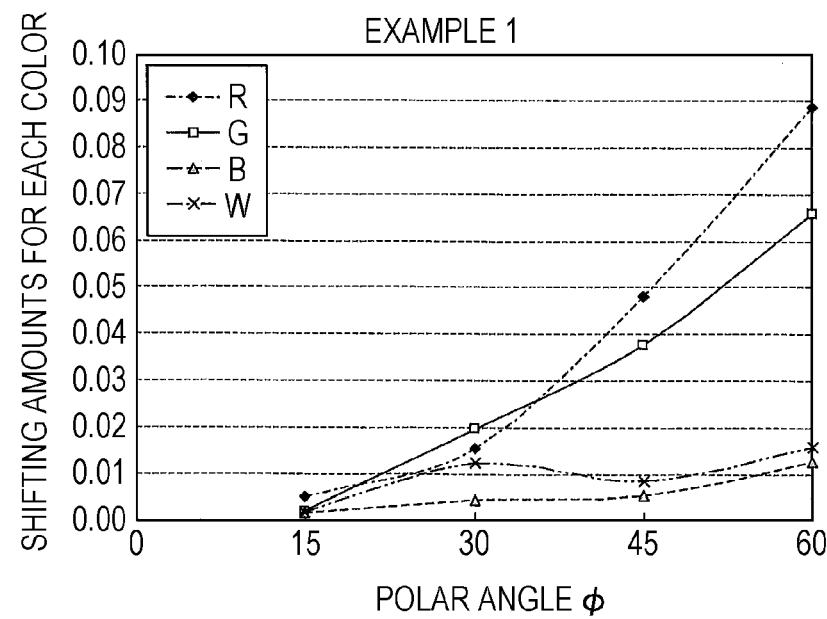
[FIG. 16]

FIG. 16 is a graph showing a relationship between shifting amounts of the R color, the G color, and the B color (correspond to Table 15, Table 16, Table 17, and Table 8, respectively) and the polar angles φ in a case where the azimuth θ of the liquid crystal panel (1) of Example 1 is 45°. As shown in the drawing, it is found that each shifting amounts of the R color and the G color changes more significantly compared to the shifting amount of the B color, and the shifting amount of the W color almost does not change, according to the change from 0° of the polar angle φ to 60° (−60°) thereof.

From the results of FIGS. 15 and 16, it is investigated that the shifting amounts of the W color becomes small when the changes of the shifting mounts of the R color and the G color are greater than the changes of the shifting amounts of the B color.

Figure 12:
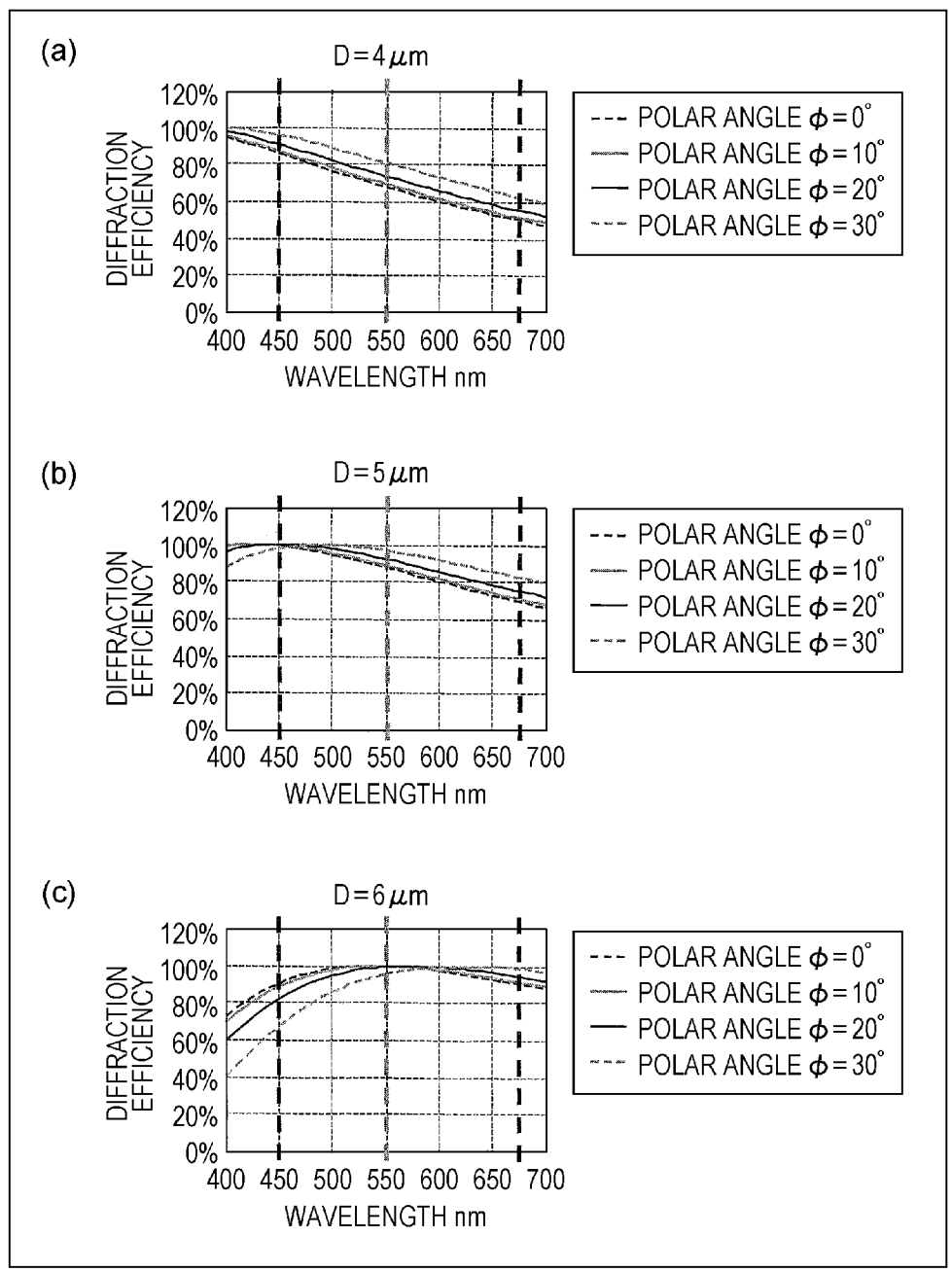
[FIG. 12]
Figure 13:
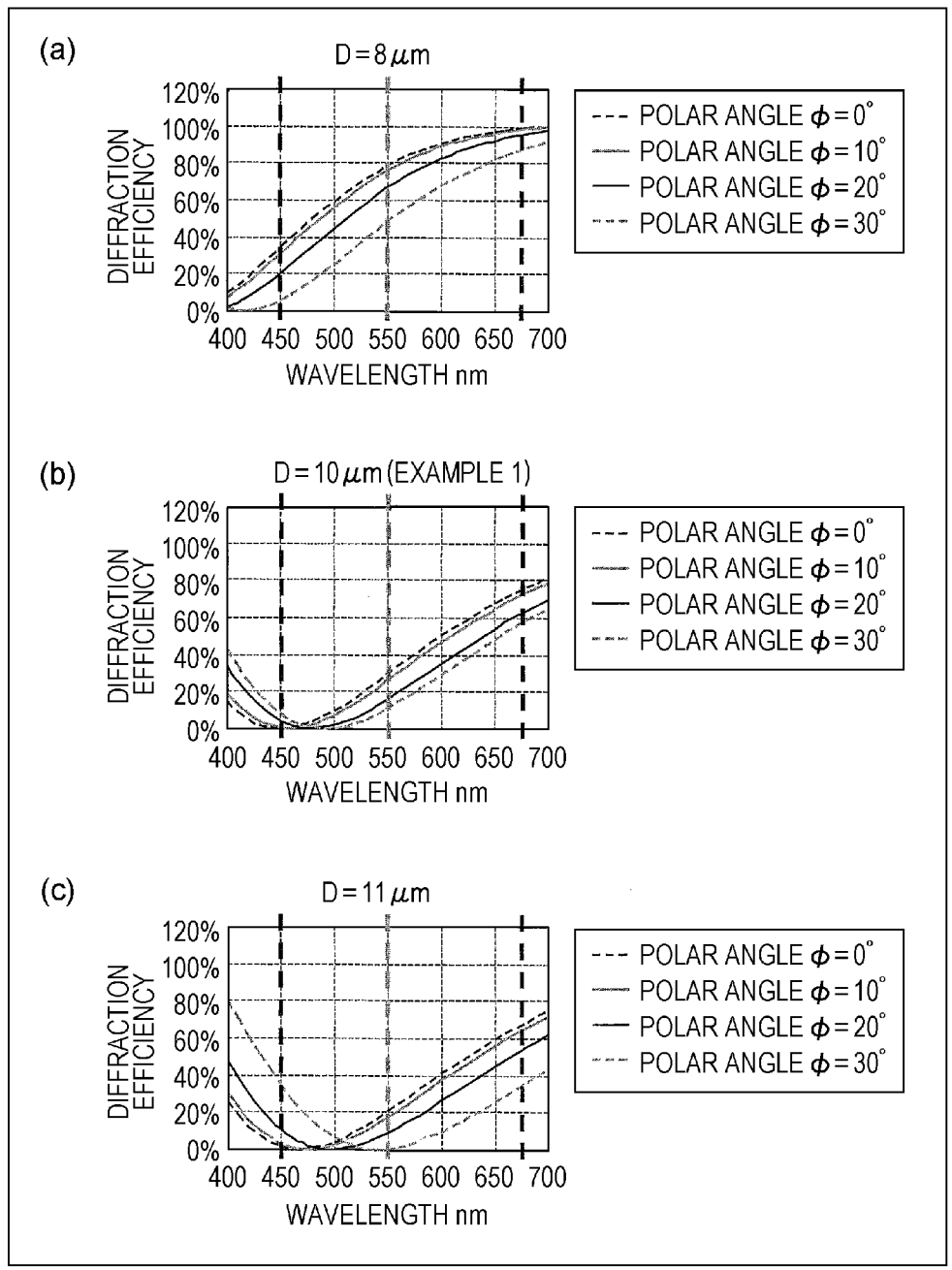
[FIG. 13]
Figure 14:
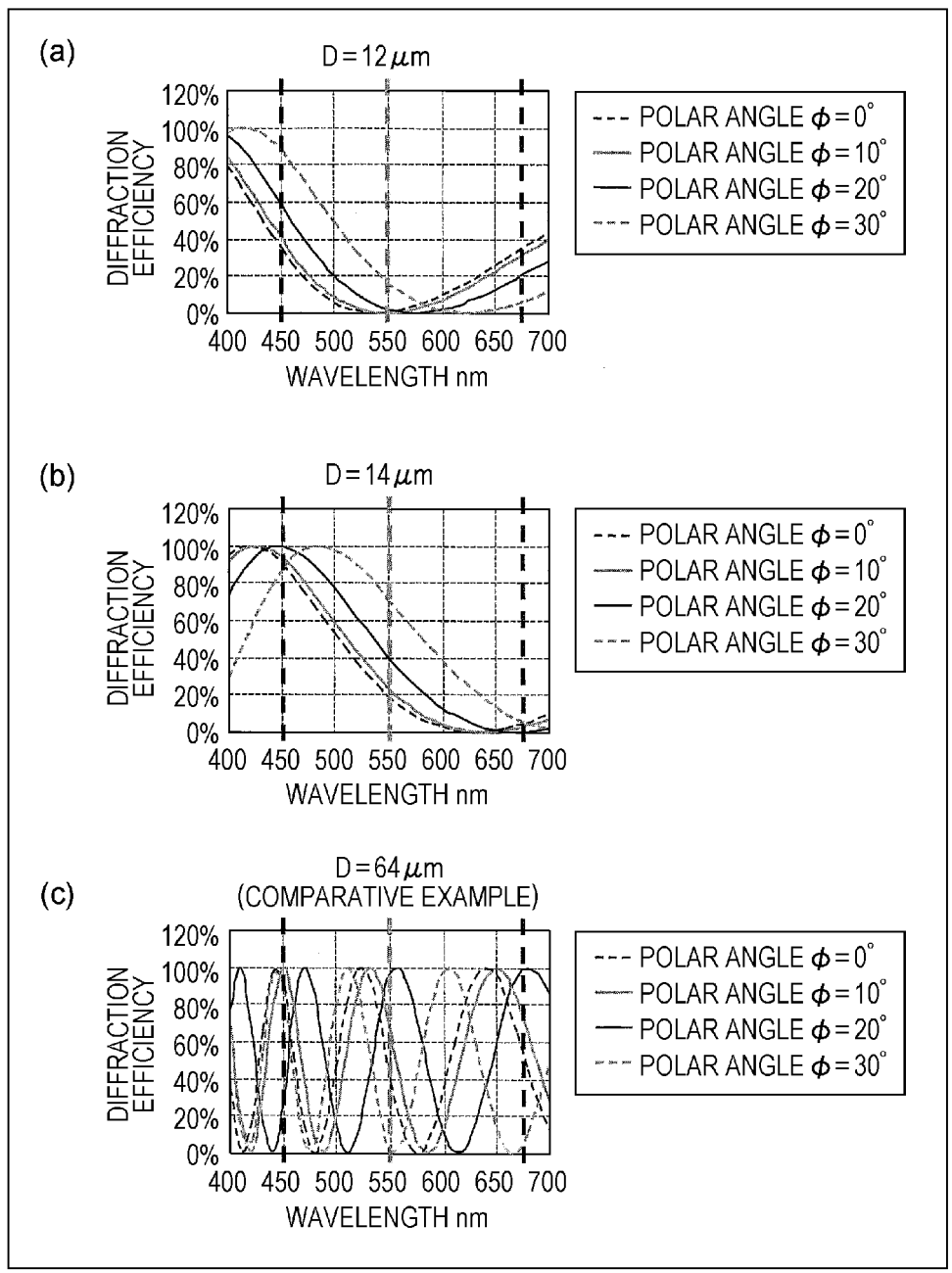
[FIG. 14]

Herein, as shown in Tables 9 to 11 and FIGS. 12 to 14, it was found that there is a correlation between the diffraction efficiency, the electrode pitch D, and the wavelength of the colors, and when the electrode pitch D is in the predetermined range, the diffraction efficiency becomes larger as the wavelength becomes longer. In addition, from the results of Example 1 (electrode pitch D=10 μm (FIG. 16)) in which the shifting amounts of the W color became smaller (that is, as the wavelength becomes longer (the R color and G color), the color shifting amounts become larger)), it is investigated that, when the electrode pitch D is in the predetermined range including D=10 μm, as the diffraction efficiency becomes larger the color shifting amounts becomes larger.

That is, in a case where the electrode pitch D is in the predetermined range, it was found that, when the diffraction efficiency of the light of the wavelength of red color (R) and the diffraction efficiency of the light of the wavelength of green color (G) are greater than the diffraction efficiency of the light of the wavelength of blue color (B), the shifting amounts of white color (W) becomes smaller.

Accordingly, in order to suppress the color shifting (color change) of the white color (W), it is investigated that the electrode pitch D needs to be set so that the diffraction efficiency of the light of the wavelength of red color (R) and the diffraction efficiency of the light of the wavelength of green color (G) are greater than the diffraction efficiency of the light of the wavelength of blue color (B).

Herein, Table 18 shows the diffraction efficiencies of the wavelengths of R color, G color, and B color of Table 9, diffraction efficiencies of light of wavelength of R color with respect to optical diffraction efficiency of wavelength of B color (that is, optical diffraction efficiency of wavelength of R color−optical diffraction efficiency of wavelength of B color), and optical diffraction efficiency of wavelength of G color with respect to optical diffraction efficiency of wavelength of B color (that is, optical diffraction efficiency of wavelength of G color−optical diffraction efficiency of wavelength of B color).

Herein, Table 19 shows the diffraction efficiencies of the wavelengths of R color, G color, and B color of Table 10, diffraction efficiencies of light of wavelength of R color with respect to optical diffraction efficiency of wavelength of B color (that is, optical diffraction efficiency of wavelength of R color−optical diffraction efficiency of wavelength of B color), and optical diffraction efficiency of wavelength of G color with respect to optical diffraction efficiency of wavelength of B color (that is, optical diffraction efficiency of wavelength of G color−optical diffraction efficiency of wavelength of B color).

Herein, Table 20 shows the diffraction efficiencies of the wavelengths of R color, G color, and B color of Table 11, diffraction efficiencies of R color with respect to diffraction efficiency of B color (that is, optical diffraction efficiency of wavelength of R color−optical diffraction efficiency of wavelength of B color), and optical diffraction efficiency of wavelength of G color with respect to optical diffraction efficiency of wavelength of B color (that is, optical diffraction efficiency of wavelength of G color−optical diffraction efficiency of wavelength of B color).

TABLE 18

| | D | | | | | | | | | | | |
|---|---|---|---|---|---|---|---|---|---|---|---|---|
| | 4 μm | | | | 5 μm | | | | 6 μm | | | |
| | φ | | | | | | | | | | | |
| | 0 | 10 | 20 | 30 | 0 | 10 | 20 | 30 | 0 | 10 | 20 | 30 |
| B | 86% | 87% | 91% | 96% | 99% | 100% | 100% | 98% | 90% | 89% | 82% | 68% |
| G | 68% | 70% | 74% | 81% | 88% | 89% | 92% | 97% | 100% | 100% | 100% | 96% |
| R | 54% | 55% | 59% | 66% | 73% | 75% | 79% | 86% | 93% | 94% | 97% | 100% |
| R-B | −32% | −32% | −32% | −30% | −26% | −25% | −21% | −12% | 3% | 5% | 14% | 32% |
| G-B | −18% | −18% | −17% | −15% | −11% | −11% | −18% | −1% | 9% | 11% | 17% | 28% |

TABLE 19

| | D | | | | | | | | | | | |
|---|---|---|---|---|---|---|---|---|---|---|---|---|
| | 8 μm | | | | 10 μm (Example 1) | | | | 11 μm | | | |
| | φ | | | | | | | | | | | |
| | 0 | 10 | 20 | 30 | 0 | 10 | 20 | 30 | 0 | 10 | 20 | 30 |
| B | 35% | 31% | 20% | 6% | 0% | 0% | 4% | 8% | 1% | 3% | 11% | 34% |
| G | 78% | 76% | 66% | 48% | 29% | 26% | 16% | 11% | 21% | 17% | 9% | 0% |
| R | 97% | 96% | 92% | 82% | 68% | 65% | 54% | 48% | 60% | 56% | 45% | 26% |
| R-B | 63% | 65% | 72% | 76% | 68% | 64% | 50% | 41% | 58% | 53% | 35% | −9% |
| G-B | 44% | 45% | 46% | 43% | 29% | 25% | 12% | 3% | 19% | 14% | −2% | −34% |

TABLE 20

| | D | | | | | | | | | | | |
|---|---|---|---|---|---|---|---|---|---|---|---|---|
| | 12 μm | | | | 14 μm | | | | 64 μm (Comparative Example) | | | |
| | φ | | | | | | | | | | | |
| | 0 | 10 | 20 | 30 | 0 | 10 | 20 | 30 | 0 | 10 | 20 | 30 |
| B | 35% | 40% | 58% | 88% | 90% | 94% | 100% | 87% | 90% | 100% | 31% | 89% |
| G | 0% | 0% | 2% | 17% | 19% | 24% | 40% | 72% | 46% | 70% | 95% | 2% |
| R | 26% | 22% | 13% | 2% | 1% | 0% | 1% | 13% | 95% | 100% | 61% | 13% |
| R-B | −9% | −18% | −46% | −86% | −90% | −94% | −99% | −74% | 5% | 0% | 29% | −76% |
| G-B | −34% | −40% | −56% | −71% | −71% | −70% | −60% | −15% | −45% | −30% | 64% | −86% |

According to the investigations described above, in Tables 18, 19, and 20, if the electrode pitch D is set to have positive values of (R-B) and (G-B), it is possible to suppress the color shifting of the white color (W). That is, by setting the electrode pitch D to satisfy 6 μm≤D≤10 μm, it is possible to suppress the color shifting (color change) of white color (W).

[Liquid Crystal Panel (2) of Example 1]

In the liquid crystal panel (1) described above, a case where the electrode pitches D of the comb-shaped electrodes 14 and 15 are constant has been described, however, the present embodiment is not limited thereto, and the electrode pitches D may be configured with two types or more in one pixel. In the configuration described above, when the electrode pitches D are set to be pitches D1 and D2 as two types, for example, a case where both of electrodes pitches D1 and D2 are set to be in a range of 6 μm≤D≤10 μm (Case 1), a case where one of the electrodes pitches D1 and D2 is set to be in a range of 6 μm≤D≤10 μm (Case 2), and a case where both of the electrodes pitches D1 and D2 are set to be out of a range of 6 μm≤D≤10 μm (Case 3) are considered. Hereinafter, Cases 1 to 3 are investigated.

(Case 1: 6 μm≤(D1 and D2)≤10 μm)

When both of the electrode pitches D1 and D2 in one pixel are set to be in the range of 6 μm≤D≤10 μm, in a case where the electrode pitch D1 is 6 μm and the electrode pitch D2 is 10 μm, for example, and a ratio of the electrode pitches D1 and D2 occupying one pixel is set to be D1:D2=1:1, since the values of (R-B) and (G-B) are positive as shown in Table 21, it is possible to suppress the color shifting (color change) of the white color (W). In addition, even in a case where the electrode pitch D1 is 6 μm and the electrode pitch D2 is 10 μm, and a ratio of the electrode pitches D1 and D2 occupying one pixel is set to be D1:D2=2:1 or D1:D2=1:2, since the values of (R-B) and (G-B) are positive as shown in Table 21, it is possible to suppress the color shifting (color change). As described above, in Case 1, since both of the electrodes pitches D1 and D2 are in the range of 6 μm≤D≤10 μm, the values of (R-B) and (G-B) become positive regardless of the ratio of the electrode pitches D1 and D2 occupying one pixel (D1:D2), and it is possible to suppress the color shifting (color change) of the white color (W).

TABLE 21

| | D | | | | | | | | | | | |
|---|---|---|---|---|---|---|---|---|---|---|---|---|
| | D1 = 6 μm/D2 = 10 μm D1:D2 = 1:1 | | | | D1 = 6 μm/D2 = 10 μm D1:D2 = 2:1 | | | | D1 = 6 μm/D2 = 10 μm D1:D2 = 1:2 | | | |
| | φ | | | | | | | | | | | |
| | 0 | 10 | 20 | 30 | 0 | 10 | 20 | 30 | 0 | 10 | 20 | 30 |
| B | 45.2% | 44.5% | 43.1% | 37.7% | 60.3% | 59.2% | 56.2% | 47.7% | 30.2% | 29.7% | 30.1% | 27.8% |
| G | 64.6% | 62.8% | 57.6% | 53.3% | 76.4% | 75.2% | 71.5% | 67.4% | 52.8% | 50.5% | 43.6% | 39.2% |
| R | 80.4% | 79.3% | 75.4% | 74.0% | 84.6% | 84.2% | 82.5% | 82.5% | 76.2% | 74.4% | 68.3% | 65.5% |
| R-B | 35% | 35% | 32% | 36% | 24% | 25% | 26% | 35% | 46% | 45% | 38% | 38% |
| G-B | 19% | 18% | 14% | 16% | 16% | 16% | 15% | 20% | 23% | 21% | 13% | 11% |

(Case 2: 6 μm≤(D1 or D2)≤10 μm)

When one of the electrode pitches D1 and D2 in one pixel is set to be in the range of 6 μm≤D≤10 μm and another one is set to be out of the range of 6 μm≤D≤10 μm, for example, in a case where the electrode pitch D1 is set to be 4 μm and the electrode pitch D2 is set to be 10 μm, the values of (G-B) are negative with the polar angles φ of 20° and 30° when the ratio of the electrode pitches D1 and D2 occupying one pixel is D1:D2=1:1, as shown in Table 22, the color shifting (color change) of the white color (W) may occur. Herein, it is considered to set the rate of the electrode pitch D2 set in the range of 6 μm≤D≤10 μm larger. For example, the ratio thereof is set as D1:D2=1:2 or 1:3 in one pixel. However, even with this ratio, the values of (G-B) still become negative. If the rate of the electrode pitch D2 is set to be further larger, and the ratio of the electrode pitches D1 and D2 occupying one pixel is set as D1:D2=1:4 or 1:5, the values of (R-B) and (G-B) become positive as shown in Table 23. Accordingly, it is possible to suppress the color shifting (color change).

TABLE 22

| | D | | | | | | | | | | | |
|---|---|---|---|---|---|---|---|---|---|---|---|---|
| | D1 = 4 μm/D2 =10 μm D1:D2 = 1:1 | | | | D1 = 4 μm/D2 = 10 μm D1:D2 = 1:2 | | | | D1 = 4 μm/D2 = 10 μm D1:D2 = 1:3 | | | |
| | φ | | | | | | | | | | | |
| | 0 | 10 | 20 | 30 | 0 | 10 | 20 | 30 | 0 | 10 | 20 | 30 |
| B | 43.0% | 43.7% | 47.4% | 52.0% | 28.7% | 29.2% | 32.9% | 37.3% | 21.5% | 22.0% | 25.7% | 29.9% |
| G | 48.7% | 47.6% | 44.7% | 46.1% | 42.2% | 40.3% | 35.0% | 34.4% | 39.0% | 36.7% | 30.2% | 28.5% |

TABLE 22-continued

| | D | | | | | | | | | | | |
|---|---|---|---|---|---|---|---|---|---|---|---|---|
| | D1 = 4 μm/D2 = 10 μm D1:D2 = 1:1 | | | | D1 = 4 μm/D2 = 10 μm D1:D2 = 1:2 | | | | D1 = 4 μm/D2 = 10 μm D1:D2 = 1:3 | | | |
| | φ | | | | | | | | | | | |
| | 0 | 10 | 20 | 30 | 0 | 10 | 20 | 30 | 0 | 10 | 20 | 30 |
| R | 60.7% | 59.7% | 56.5% | 57.2% | 63.0% | 61.3% | 55.7% | 54.3% | 64.2% | 62.1% | 55.3% | 52.8% |
| R-B | 18% | 16% | 9% | 5% | 34% | 32% | 23% | 17% | 43% | 40% | 30% | 23% |
| G-B | 6% | 4% | −3% | −6% | 14% | 11% | 2% | −3% | 17% | 15% | 4% | −1% |

TABLE 23

| | D | | | | | | | |
|---|---|---|---|---|---|---|---|---|
| | D1 = 4 μm/D2 = 10 μm D1:D2 = 1:4 | | | | D1 = 4 μm/D2 = 10 μm D1:D2 = 1:5 | | | |
| | φ | | | | | | | |
| | 0 | 10 | 20 | 30 | 0 | 10 | 20 | 30 |
| B | 17.2% | 17.6% | 21.4% | 25.5% | 14.3% | 14.7% | 18.5% | 22.6% |
| G | 37.0% | 34.5% | 27.3% | 25.0% | 35.7% | 33.0% | 25.3% | 22.7% |
| R | 64.9% | 62.6% | 55.1% | 52.0% | 65.4% | 62.9% | 54.9% | 51.4% |
| R-B | 48% | 45% | 34% | 26% | 51% | 48% | 36% | 29% |
| G-B | 20% | 17% | 6% | 0% | 21% | 18% | 7% | 0% |

When the electrode pitch D1 is set to be 6 μm and the electrode pitch D2 is set to be 11 μm, for example, since the values of (G-B) are negative with the polar angle φ of 30° when the ratio of the electrode pitches D1 and D2 occupying one pixel is D1:D2=1:1, as shown in Table 24, the color shifting (color change) may occur. As described above, it is considered to set the rate of the electrode pitch D1 set in the range of 6 μm≤D≤10 μm larger. For example, the ratio of the electrodes pitches D1 and D2 occupying one pixel is set as D1:D2=2:1 or 3:1. Then, since the values of (G-B) become positive, it is possible to suppress the color shifting (color change).

As described above, in Case 2, the rate of the electrode pitch occupying one pixel set in the range of 6 μm≤D≤10 μm from the electrode pitches D1 and D2 is set to be larger than the rate of another electrode pitch occupying one pixel, and the ratio D1:D2 of the electrode pitches D1 and D2 occupying one pixel is set to be a predetermined value. Accordingly, since the values of (R-B) and (G-B) become positive, it is possible to suppress the color shifting (color change) of the white color (W).

(Case 3: (D1 and D2)<6 μm, 10 μm<(D1 and D2))

When both of the electrode pitches D1 and D2 are set to be out of the range of 6 μm≤D≤10 μm, for example, in a case where the electrode pitch D1 is set to be 4 μm and the electrode pitch D2 is set to be 11 μm, as shown in Tables 25 and 26, in any cases when the ratio of the electrodes pitches D1 and D2 occupying one pixel is D1:D2=1:1, D1:D2=1:2, D1:D2=2:1, D1:D2=1:3, and D1:D2=3:1, since the values of (R-B) or (G-B) become negative, the color shifting (color change) may occur.

TABLE 24

| | D | | | | | | | | | | | |
|---|---|---|---|---|---|---|---|---|---|---|---|---|
| | D1 = 6 μm/D2 = 11 μm D1:D2 = 1:1 | | | | D1 = 6 μm/D2 = 11 μm D1:D2 = 2:1 | | | | D1 = 6 μm/D2 = 11 μm D1:D2 = 3:1 | | | |
| | φ | | | | | | | | | | | |
| | 0 | 10 | 20 | 30 | 0 | 10 | 20 | 30 | 0 | 10 | 20 | 30 |
| B | 46.0% | 45.8% | 46.4% | 51.0% | 60.8% | 60.1% | 58.4% | 56.5% | 68.2% | 67.2% | 64.3% | 59.3% |
| G | 60.3% | 58.7% | 54.1% | 48.0% | 73.5% | 72.5% | 69.2% | 63.9% | 80.1% | 79.3% | 76.8% | 71.8% |
| R | 76.4% | 75.1% | 70.9% | 62.7% | 81.9% | 81.4% | 79.5% | 75.0% | 84.7% | 84.6% | 83.8% | 81.1% |
| R-B | 30% | 29% | 25% | 12% | 21% | 21% | 21% | 18% | 17% | 17% | 20% | 22% |
| G-B | 14% | 13% | 8% | −3% | 13% | 12% | 11% | 7% | 12% | 12% | 12% | 13% |

TABLE 25

| | D | | | | | | | | | | | |
|---|---|---|---|---|---|---|---|---|---|---|---|---|
| | D1 = 4 µm/D2 = 11 µm D1:D2 = 1:1 | | | | D1 = 4 µm/D2 = 11 µm D1:D2 = 1:2 | | | | D1 = 4 µm/D2 = 11 µm D1:D2 = 2:1 | | | |
| | φ | | | | | | | | | | | |
| | 0 | 10 | 20 | 30 | 0 | 10 | 20 | 30 | 0 | 10 | 20 | 30 |
| B | 43.7% | 45.1% | 50.7% | 65.2% | 29.6% | 31.0% | 37.3% | 55.0% | 57.8% | 59.1% | 64.1% | 75.5% |
| G | 44.4% | 43.5% | 41.3% | 40.7% | 36.5% | 34.8% | 30.4% | 27.3% | 52.3% | 52.1% | 52.1% | 54.2% |
| R | 56.6% | 55.5% | 52.0% | 45.9% | 57.6% | 55.7% | 49.7% | 39.2% | 55.6% | 55.3% | 54.3% | 52.6% |
| R-B | 13% | 10% | 1% | −19% | 28% | 25% | 12% | −16% | −2% | −4% | −10% | −23% |
| G-B | 1% | −2% | −9% | −25% | 7% | 4% | −7% | −28% | −6% | −7% | −12% | −21% |

TABLE 26

| | D | | | | | | | | |
|---|---|---|---|---|---|---|---|---|---|
| | D1 = 4 µm/D2 = 11 µm D1:D2 = 1:3 | | | | D1 = 4 µm/D2 = 11 µm D1:D2 = 3:1 | | | | |
| | φ | | | | | | | | |
| | 0 | 10 | 20 | 30 | 0 | 10 | 20 | 30 | |
| B | 22.6% | 24.0% | 30.7% | 49.8% | 64.8% | 66.1% | 70.8% | 80.6% | |
| G | 32.5% | 30.4% | 25.0% | 20.5% | 56.3% | 56.5% | 57.5% | 60.9% | |
| R | 58.1% | 55.8% | 48.6% | 35.8% | 55.1% | 55.2% | 55.4% | 56.0% | |
| R-B | 36% | 32% | 18% | −14% | −10% | −11% | −15% | −25% | |
| G-B | 10% | 6% | −6% | −29% | −9% | −10% | −13% | −20% | |

Figure 22:
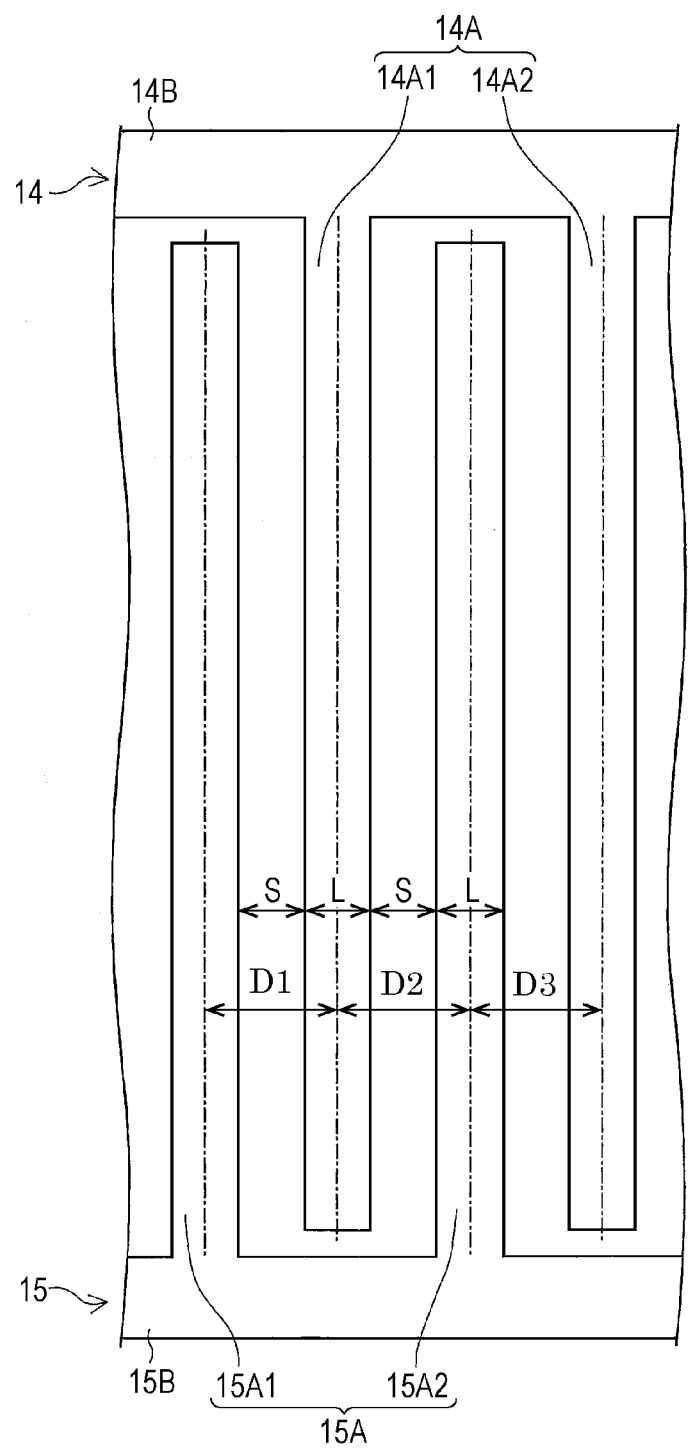
[FIG. 22]

According to the results of Cases 1 to 3 described above, in the liquid crystal panel (2) configured with two types or more electrode pitches D in one pixel (shown in FIG. 22), it is found that, in order to suppress the color shifting (color change) of the white color (W), in each pixel, at least electrode pitch D1 as one type of pitches needs to be set in the range of 6 µm≤D1≤10 µm and average values Dm of all electrode pitches occupying the pixel need to be set in a range of 6 µm≤Dm≤10 µm.

[Embodiment 2]

Figure 17:
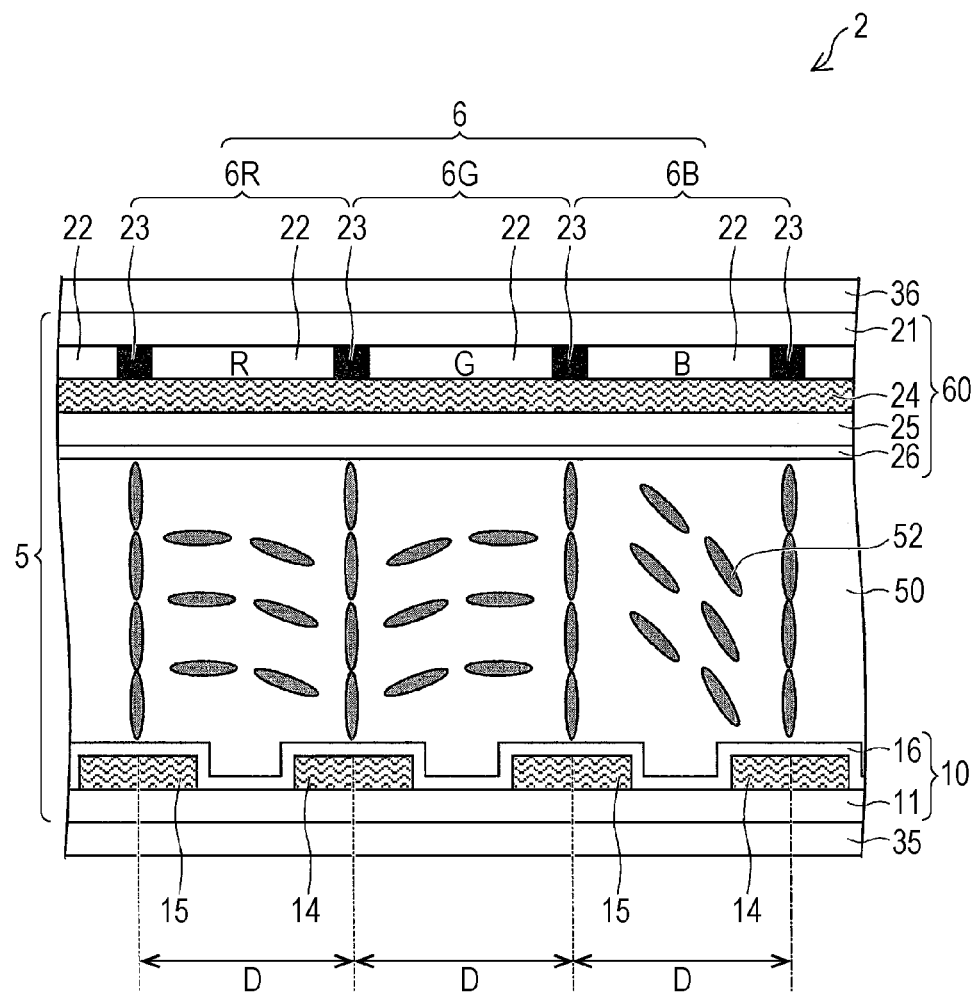
[FIG. 17]

The following description discusses, with reference to FIG. 17, another embodiment of the present invention.

Note that the following description discusses differences between the liquid crystal panel 2 in accordance with Embodiment 1 and a liquid crystal panel in accordance with the present embodiment. The same reference signs are appended to components which have the same functions as those described in Embodiment 1, and explanations for the components are omitted.

FIG. 17 is a cross-sectional view schematically illustrating an outline configuration of a main part of a liquid crystal panel 2 in accordance with Embodiment 2.

As illustrated in FIG. 17, the liquid crystal panel 2 in accordance with the present embodiment 2 includes, instead of the substrate 20, a substrate 60 provided with a sheet-shaped electrode 24 and an insulating layer 25. In this point, the liquid crystal panel 2 in accordance with the present embodiment is different from the liquid crystal panel 2 illustrated in FIG. 1.

The substrate 60 has the same structure as the substrate 20 illustrated in FIG. 1, except for a feature that the sheet-shaped electrode 24 and the insulating layer 25 are provided.

The sheet-shaped electrode 24 is a common electrode. The sheet-shaped electrode 24 is provided on the entire display area (that is, an area surrounded by a sealing material (not illustrated)) of the substrate 60 so as to cover color filters 22 and a black matrix 23.

The insulating layer 25 is provided on the entire display area of the substrate 60 so as to cover the sheet-shaped electrode 24.

The sheet-shaped electrode 24 is not limited in particular, provided that the sheet-shaped electrode 24 is made of a transparent electrode material. For example, the sheet-shaped electrode 24 may be made of a transparent electrode material such as ITO (indium tin oxide), IZO (indium zinc oxide), or the like, and also may be made of a metal such as aluminum. Further, the sheet-shaped electrode 24 may be made of the same electrode material as the comb-shaped electrodes 14 and 15, and also may be made of a different electrode material. A method for forming (laminating) an electrode is not limited in particular, and conventionally known methods such as a sputtering method, a vacuum deposition method, and a plasma CVD method can be applied. The film thickness of the electrode is not limited in particular. However, it is preferable that the film thickness is in a range from 100 Å to 2000 Å.

Further, as the insulating layer 25, various insulating materials including an organic insulating material such as an acrylic resin and an inorganic insulating material such as silicon nitride (SiN) can be used.

(Display System)

Next, as to a display system (vertical alignment in-plane mode) of the liquid crystal panel 2, the following description discusses difference between the liquid crystal panel 2 in accordance with Embodiment 1 and the liquid crystal panel 2 in accordance with the present embodiment.

The liquid crystal panel 2 is configured such that the sheet-shaped electrode 24 is provided on the substrate 60 and, by setting one of the comb-shaped electrodes 14 and 15 (which acts as a counter electrode) to the same potential as the sheet-shaped electrode 24 of the substrate 60 and using the other one of the comb-shaped electrodes 14 and 15 as a drain electrode, a horizontal electric filed is generated between the comb-shaped electrodes 14 and 15 and a diagonal electric filed is generated between the one of the comb-shaped electrodes 14 and 15 (which is the counter electrode) and the sheet-shaped electrode 24. Thereby, it is possible to remove a dark line part (a part in which the liquid crystal molecules 52 do not move) which occurs in a center area between the comb-shaped electrodes 14 and 15 of the liquid crystal panel 2 in accordance with Embodiment 1 due to an effect of the diagonal electric filed. Therefore, compared to the liquid crystal panel 2 in accordance with Embodiment 1, it is possible to enlarge numerical aperture.

[Liquid Crystal Panel (3) of Example 2]

The following description specifically discusses a schematic configuration of the liquid crystal panel 2, which has the structure illustrated in FIG. 17, with reference to an example of a production method of a liquid crystal panel (3) of Example 2 which liquid crystal panel (3) was actually used for verification.

A substrate 10 of the liquid crystal panel (3) was formed with the same material and the same process as the production method of the substrate 10 of the liquid crystal panel (1).

On the other hand, color filters 22 and a black matrix 23 which are 1.2 μm in thickness were formed on a glass substrate 21 by a known method. Furthermore, a 1000 Å-thick ITO film is deposited on the entire color filters 22 and black matrix 23 by a sputtering method. Thereby, a sheet-shaped electrode 24 which covers the entire display area of the glass substrate 21 was formed.

Next, an acrylic insulating material with a thickness of 1 to 3 μm and $\in$=3.4 (insulating layer 25) was formed on the entire sheet-shaped electrode 24 by spin coating, and then heated at 200° C. for one hour.

Next, on the insulating layer 25, a column-shaped spacer was applied by spin coating, and then formed into a 3.4 μm-high spacer by photolithography.

Thereafter, an alignment film material "JALS-204" (product name, solid content 5 wt. %, γ-butyrolactone solution) made by JSR corporation was applied by spin coating. After that, the alignment film material was heated at 200° C. for two hours. Thereby, a substrate 60 with an alignment film 26 serving as a vertical alignment film on a surface facing a liquid crystal layer 50 was formed. The alignment films 16 and 26 thus prepared was 1000 Å (=0.1 μm) in dry film thickness.

Thereafter, on one of the substrates 10 and 60, a sealing resin "STRUCT BOND XN-21S" (production name, Mitsui Toatsu Chemicals) serving as a sealing material was printed.

Next, the substrates 10 and 60 were attached to each other, and heated at 135° C. for one hour.

Thereafter, as a liquid crystal material, a positive-type liquid crystal material (Δ$\in$=18, Δn=0.1) of Merck Japan was enclosed between the substrates 10 and 60 by a vacuum injection method. Thereby, a liquid crystal cell 5 in which the liquid crystal layer 50 was sandwiched between a pair of the substrates 10 and 60 was prepared.

Then, polarizers 35 and 36 were attached to a top surface and a back surface of the liquid crystal cell 5 respectively so that transmission axes of the polarizers 35 and 36 cross each other at the right angle and that tooth-electrodes 14A and 15A of the respective comb-shaped electrodes 14 and 15 extend at an angle of 45° to the transmission axes of the polarizers 35 and 36. In this way, a liquid crystal panel 2 (liquid crystal display element) shown in FIG. 17 was produced.

(Result of Verification)

Next, as to effects of the liquid crystal panel 2 in accordance with Embodiment 2, the following description discusses a result of the verification with the use of the liquid crystal panel (3) of Example 2.

The liquid crystal panel (3) of Example 2 and the liquid crystal panel 100 of a comparative example were examined on a color shift (color change) that occurs according to a viewing angle. The measurement was conducted with the use of "Ez-contrast160R" made by Eldim and generally-used CCF backlights on which the liquid crystal panel (3) and the liquid crystal panel 100 are respectively mounted.

Further, the liquid crystal panel (3) of Example 2 was configured in the same way as the liquid crystal panel (1) of Example 1. That is, electrode width L of each of the comb-shaped electrodes 14 and 15 (width of each of the tooth electrodes 14A and 15A) was set to 2.5 μm, an electrode interval S between the comb-shaped electrodes 14 and 15 (a distance between the tooth electrodes 14A and 15A which distance creates a space) was set to 7.5 μm, and an electrode pitch D of the comb-shaped electrodes 14 and 15 (a distance from the center of the tooth electrode 14A serving as an electrode line to the center of the tooth electrode 15A serving as an electrode line, D=(L+S)/2)) was set to 10 μm.

Under the above condition, a shift amount of each color which had been measured was the same as that of the liquid crystal panel (1) of Example 1, and an actual shift amount of white color was the same as that of the liquid crystal panel (1) of Example 1.

(Diffraction Efficiency)

As has been described in Tables 9 to 11, diffraction efficiency is correlative with an electrode pitch D, wavelength nm, and a polar angle φ. Therefore, the diffraction efficiency of the liquid crystal panel (3) of Example 2 is considered as being identical with the diffraction efficiency of the liquid crystal panel (1) of Example 1.

Therefore, as in the liquid crystal panel (1) of Example 1, in Tables 18, 19, and 20, when an electrode pitch D with which values of (R-B) and (G-B) become positive is set, it is possible to suppress a color shift. That is, also in the liquid crystal panel (3) of Example 2, it is possible to suppress a color shift (color change) of white color (W) by setting the electrode pitch D to 6 μm≤D≤10 μm. As described, the sheet-shaped electrode 24 of the substrate 60 was found to give no influence over a color shift of white color (W).

Needless to say, a color shift (color change) in the liquid crystal panel (3) of Embodiment 2 can be suppressed by setting the electrode pitch D to the same as that of the liquid crystal panel (2) of Example 1 even in a case where the electrode pitch D in one pixel is constituted by two or more types.

[Embodiment 3]

Figure 18:
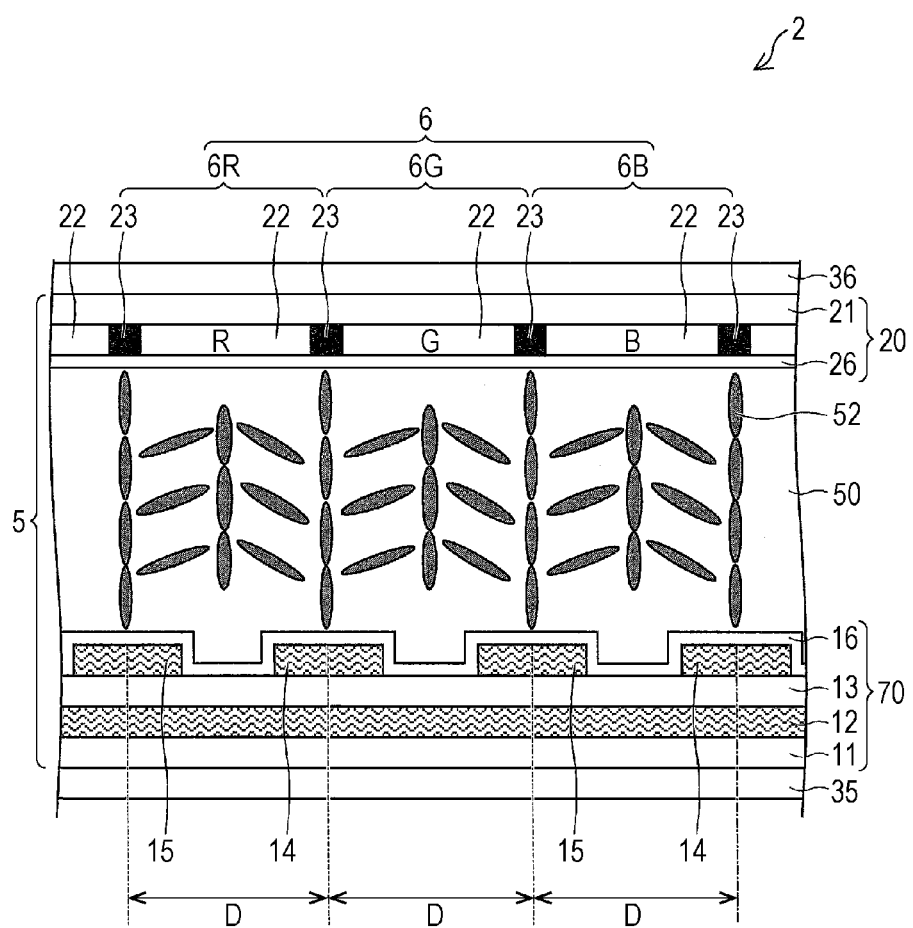
[FIG. 18]

The following description discusses Embodiment 3 of the present invention with reference to FIG. 18.

Note that (i) the following description discusses differences between a liquid crystal panel 2 of Embodiment 3 and the liquid crystal panel 2 of Embodiment 1. The same reference signs are appended to components which have the same functions as those described in Embodiment 1, and explanations for the components are omitted.

FIG. 18 is a cross-sectional view schematically illustrating an outline configuration of main parts of the liquid crystal panel 2 in accordance with Embodiment 3.

As illustrated in FIG. 18, the liquid crystal panel 2 of Embodiment 3 is different from the liquid crystal panel 2 illustrated in FIG. 1 in that the liquid crystal panel 2 of Embodiment 3 includes, instead of the substrate 10, a substrate 70 in which a sheet-shaped electrode 12 (third electrode) and an insulating layer 13 are provided.

The substrate 70 has a structure identical to that of the substrate 10 illustrated in FIG. 1 except that the substrate 70 includes the sheet-shaped electrode 12 and the insulating layer 13.

The sheet-shaped electrode 12 is a common electrode, and is provided on substantially all over an entire surface of a glass substrate 11 which surface faces a substrate 20, such that the sheet-shaped electrode 12 covers a display region (region enclosed with a sealant) of the substrate 70.

The insulating layer 13 is provided on the entire display region of the substrate 70 in a solid shape so as to cover the sheet-shaped electrode 12. The comb-shaped electrodes 14 and 15 are formed on the insulating layer 13.

The sheet-shaped electrode 12 is not limited to any particular one, provided that the sheet-shaped electrode 12 is made of a transparent electrode material. The transparent electrode for the sheet-shaped electrode 12 can be, for example, a transparent electrode material such as ITO (indium tin oxide), IZO (indium zinc oxide) or the like, or can be a metal such as aluminum. The transparent electrode material for the electrode can also be identical to an electrode material used for comb-shaped electrodes 14 and 15, or can be different from such an electrode material. A method for forming (laminating) the electrode is not limited to any particular one, and examples of the method encompass a variety of conventional and well-known methods such as sputtering, vacuum vapor deposition, and plasma CVD. Although the sheet-shaped electrode 12 is not particularly limited in its thickness, it is preferable that the thickness is set to be in a range of 100 Å to 2000 Å.

Examples of a material for the insulating layer 13 encompass various insulating materials such as (i) an organic insulating material such as acrylic resin or (ii) an inorganic insulating material such as silicon nitride (SiN).

(Display Method)

The following description will discuss differences between a display method of the liquid crystal panel 2 (vertical alignment in-plane mode) in accordance with Embodiment 3 from the display method of the liquid crystal panel 2 in accordance with Embodiment 1.

The liquid crystal panel 2 of Embodiment 3 is configured to drive liquid crystal molecules 52 with the use of a fringe electric field generated by (i) forming the sheet-shaped electrode 12, the insulating layer 13, and the comb-shaped electrodes 14 and 15 in this order on the substrate 70 and (ii) configuring the comb-shaped electrodes 14 and 15 to have the same voltages. In a case where the insulating layer 13 is used as a transparent Cs (capacitor) in this configuration, there is then no need for producing another Cs for actual pixels. Therefore, this configuration allows the liquid crystal panel 2 in accordance with Embodiment 3 to have such an advantage that an aperture ratio can be higher than that of the liquid crystal panel 2 in accordance with Embodiment 1.

[Liquid Crystal Panel (4) of Example 3]

The following description specifically discusses a schematic configuration of the liquid crystal panel 2, which has the structure illustrated in FIG. 18, with reference to an example of a production method of a liquid crystal panel (4) of Example 3 which liquid crystal panel (4) was actually used for verification.

First, a sheet-shaped electrode 12, which covers the entire surface of a display region of a glass substrate 11, was formed by providing, in a form of a film having a thickness of 1000 Å, ITO on the glass substrate 11 by use of sputtering (see FIG. 18).

Next, an insulating layer 13 was formed as an array-side insulating layer by coating, with the use of spin coating/ sputtering, the entire surface of the sheet-shaped electrode 12 with an acrylic insulating material (e=3.7) so as to form the acrylic insulating material into a film having a thickness of 1 to 3 μm.

Next, comb-shaped electrodes 14 and 15, each of which has a width L of 2.5 μm, were formed with each inter-distance S of 7.5 μm by (i) applying, to the entire surface of the insulating layer 13, ITO in a thickness of 1000 Å by use of sputtering and then (ii) removing parts of the ITO by use of photolithography.

Next, an alignment film 16, which is a vertical alignment film, was formed by (i) coating, by use of spin coating, the glass substrate 11 with an alignment film material (product name: JALS-204, made by JSR Corporation, solid content: 5 wt %, type: γ-butyrolactone solution) so that the comb-shaped electrodes 14 and 15 are covered with the alignment film material and then (ii) baking the alignment film material at a temperature of 200° C. for 2 hours. Throughout this process above, a substrate 70 was formed on a surface of the glass substrate 11 which surface will face a liquid crystal layer 50.

Meanwhile, a substrate 20 of the liquid crystal panel (4) was formed by use of materials and a process which are identical to those used in the method for producing the substrate 20 of the liquid crystal panel (1).

The alignment film 16 and an alignment film 26 thus formed each had a thickness of 1000 Å (=0.1 μm).

Subsequently, a sealing resin (product name: Struct Bond XN-21S, made by Mitsui Toatsu Chemicals, Inc) as a sealant was printed on one of the substrates 70 and 20.

Next, the substrates 70 and 20 were combined together to be a pair and then heated at a temperature of 135° C. for 1 hour.

Next, a gap between the pair of substrates 70 and 20 was filled with a positive type liquid crystal material ($\Delta\epsilon$=18, $\Delta$n=0.1, made by Merck KGaA) so that a liquid crystal layer 50 filling the gap was formed. Thus, a liquid crystal cell 5, in which the liquid crystal layer 50 is sandwiched between the pair of the substrates 70 and 20, was produced.

Next, polarizers 35 and 36 were attached with a back surface and a front surface of the liquid crystal cell 5, respectively, such that (i) transmission axes of the respective polarizers 35 and 36 are at the right angle to each other and (ii) tooth electrodes 14A of the comb-shaped electrodes 14 and tooth electrodes 15A of the comb-shaped electrodes 15 extend in directions intersected with the transmission axes at an angle of 45°. In this way, the liquid crystal panel 2 (liquid crystal display element) illustrated in FIG. 18 was prepared.

(Examination Result)

The following description will discuss the effects of the liquid crystal panel 2 which effects were examined with the use of the liquid crystal panel (4) of Example 3.

In the examination, color shifting (color change) depending on a viewing angle of the liquid crystal panel (4) of Example 3 and a liquid crystal panel 100 of Comparative Example were examined. The measurement was carried out with the use of an Ez-contrast 160R (manufactured by Eldim Corporation) and with generally-used backlights on which the liquid crystal panels were respectively mounted.

As in the case of the liquid crystal panel (1) of Example 1, the liquid crystal panel (4) of Example 3 was configured such that (i) the width L of each of the comb-shaped electrodes 14 and 15 (width of each of the tooth electrodes 14A and 15A) was set to 2.5 μm, (ii) the inter-distance S between adjacent comb-shaped electrodes 14 and 15 (amount of space between adjacent tooth electrodes 14A and 15A) was set to 7.5 μm, and (iii) a pitch D between adjacent comb-shaped electrodes 14 and 15 (distance between a center of a tooth electrode 14A and a center of a tooth electrode 15A, which tooth electrodes 14A and 15A are to be electrodes lines (D=(L+S)/2)) was set to 10 µm.

The following is an analysis of an actual shifting amount of white color, based on shifting amounts of respective colors which shifting amounts were measured in the examination under the conditions above.

First, color shifting at a location where an azimuth θ is 0° (i.e. parallel to a polarizing axis) will be analyzed. Table 27 illustrates shifting amounts of white color (W) which are calculated, based on chromaticity coordinates for a case where an azimuth θ of the liquid crystal panel 100 of Comparative Example is 0° (i.e. parallel to a polarizing axis).

TABLE 27

| φ | x | y | Shifting amount of W color |
|---|---|---|---|
| 15 | 0.001983 | 0.000265 | 0.002 |
| 30 | 0.006615 | 0.004494 | 0.008 |
| 45 | 0.013168 | 0.007824 | 0.015 |
| 60 | 0.017273 | 0.013060 | 0.022 |

Table 28 indicates shifting amounts of white color (W) which are calculated, based on chromaticity coordinates in a case where an azimuth θ of the liquid crystal panel (4) of Example 3 is 0° (i.e. parallel to a polarizing axis).

TABLE 28

| φ | x | y | Shifting amount of W color |
|---|---|---|---|
| 15 | 0.004328 | 0.002806 | 0.005 |
| 30 | 0.001316 | 0.002542 | 0.003 |
| 45 | 0.000188 | 0.000764 | 0.001 |
| 60 | −0.001207 | −0.006171 | 0.006 |

Figure 19:
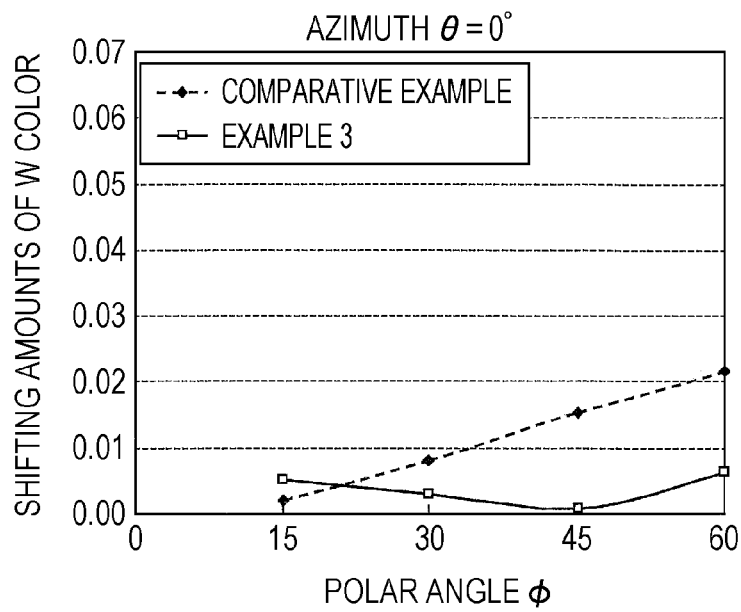
[FIG. 19]

FIG. 19 is a graph in which the shifting amounts of Table 27 and Table 28 are plotted. As shown in the drawing, in a case where the azimuth θ is 0°, the maximum shifting amount in the liquid crystal display panel 100 of Comparative Example was 0.022, and the maximum shifting amount in the liquid crystal display panel (4) of Example 3 was 0.006. It is found that both shifting amounts was slight and significant color shifting did not occur, in the same manner as the liquid crystal panel (1) of Example 1. That is, in a level to be visually recognized, the white color is not seen to be tinged with yellow.

Next, the following is an analysis of color shifting at a location where the azimuth θ is 45° (45° with respect to the polarizing axis). Table 29 shows the shifting amounts of white color (W) calculated based on chromaticity coordinates of white color in a case where azimuth θ of the liquid crystal panel 100 of Comparative Example is 45° (i.e. 45° with respect to a polarizing axis).

TABLE 29

| φ | x | y | Shifting amount of W color |
|---|---|---|---|
| 15 | 0.003674 | 0.002103 | 0.004 |
| 30 | 0.011834 | 0.009774 | 0.015 |
| 45 | 0.026591 | 0.021452 | 0.034 |
| 60 | 0.048644 | 0.038941 | 0.062 |

In addition, Table 30 indicates shifting amounts of the white color (W) calculated based on chromaticity coordinates in a case where the azimuth θ of the liquid crystal panel (4) of Example 3 is 45° (45° with respect to the polarizing axis).

TABLE 30

| φ | x | y | Shifting amount of W color |
|---|---|---|---|
| 15 | 0.004924 | 0.002793 | 0.006 |
| 30 | 0.004597 | 0.003377 | 0.006 |
| 45 | 0.000708 | −0.005294 | 0.005 |
| 60 | −0.003777 | −0.014731 | 0.015 |

Figure 20:
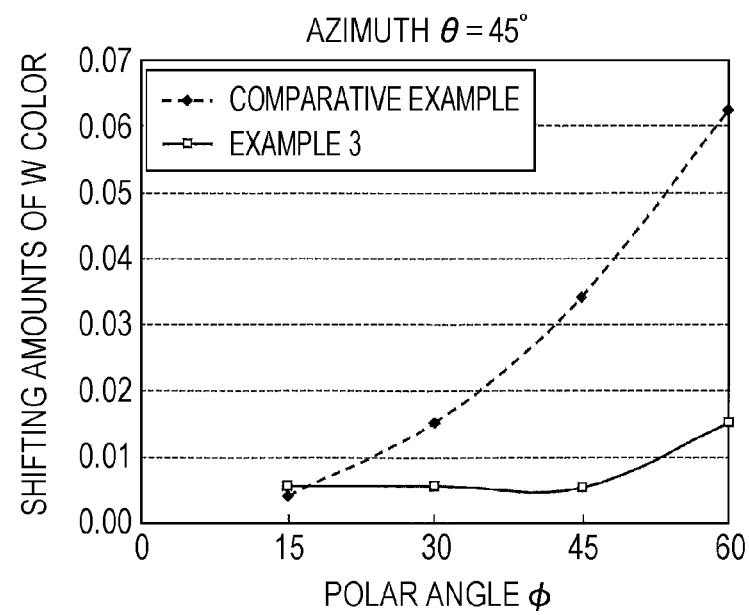
[FIG. 20]

FIG. 20 is a graph in which the shifting amounts of Table 29 and Table 30 are plotted. As shown in the drawings, in a case where the azimuth θ is 45°, the maximum shifting amount in the liquid crystal display panel (4) of Example 3 was 0.015 while the maximum shifting amount in the liquid crystal display panel 100 of Comparative Example was 0.062. It is found that the shifting amount is large in the liquid crystal panel 100 of Comparative Example and significant color shifting occurred. That is, as the polar angle φ with respect to the liquid crystal panel becomes large, the problem in that the white color is seen to be tinged with yellow occurs. On the other hand, the shifting amount in the liquid crystal panel (4) of Example 3 is substantially the same as in a case where the azimuth θ is 0° (maximum shifting amount=0.006), it is found that the significant color shifting does not occur. Accordingly, it is found that the color shifting can be suppressed with the configuration of the liquid crystal panel (4) of Example 3.

(Diffraction Efficiency)

As shown in Tables 9 to 11, the diffraction efficiency is correlated with the electrode pitch D, the wavelength nm, and the polar angle φ. Accordingly, it is investigated that the diffraction efficiency of the liquid crystal panel (4) of Example 3 is the same as the diffraction efficiency of the liquid crystal panel (1) of Example 1.

Thus, as in the same manner as the liquid crystal panel (1) of Example 1, in Table 18, Table 19 and Table 20 described above, if the electrode pitch D is set to have positive values of (R-B) and (G-B), it is possible to suppress the color shifting. That is, also in the liquid crystal panel (4) of Example 3, by setting the electrode pitch D in the range of 6 µm≤D≤10 µm, it is possible to suppress the color shifting (color change) of the white color (W).

In addition, in the liquid crystal panel (4) of Example 3, in a case where two types or more of the electrode pitches D are configured in one pixel, it is needless to say that the color shifting (color change) can be suppressed by setting the electrode pitches same as the liquid crystal panel (2) of Example 1.

In addition, in the liquid crystal panel 2 in accordance with Embodiment 3, the sheet-like electrode 24 and the insulating layer 25 of the liquid crystal panel 2 in accordance with Embodiment 2 may be provided on the substrate 20.

As described above, in the liquid crystal panel of the preset invention, the vertical alignment type liquid crystal panel using a horizontal electric field system has a configuration in that the electrode pitches D of the comb-shaped electrodes (=(L+S)/2) are set so that the optical diffraction efficiency of wavelength of the R color and the optical diffraction efficiency of wavelength of the G color are greater than the optical diffraction efficiency of wavelength of the B color. In particular, it is preferable that the electrode pitches D be set to be in a range of 6 µm≤D≤10 µm. Accordingly, with the simple configuration, it is possible to provide a liquid crystal panel and a liquid crystal display apparatus with high contrast and less color change.

In addition, the liquid crystal panel of the present invention can be suitably used in various liquid crystal display apparatuses such as a liquid crystal TV, a mobile terminal, and the like using the liquid crystal panel as a display unit.

As described above, the display apparatus according to the present invention includes:

a first substrate on which first electrodes and second electrodes are provided with pitch distances between the first electrodes and the second electrodes, respectively;

a second substrate provided to face the first substrate; and a liquid crystal layer sandwiched between the first substrate and the second substrate, the horizontal electric field driving system is used in which the liquid crystal layer is driven with horizontal electric fields generated between the first electrodes and the second electrodes, and liquid crystal molecules in the liquid crystal layer are aligned vertically to the first substrate and the second substrate when no electric field is applied on the liquid crystal molecules, each pixel includes three sub-pixels, which are of red, green, and blue, the first electrodes and the second electrodes function as a diffraction grating constituted by the first electrodes, the second electrodes, and the pitch distances therebetween, and the pitch distances between the first electrodes and the second electrodes are set such that an optical diffraction efficiency for red wavelength and an optical diffraction efficiency for green wavelength are greater than an optical diffraction efficiency for blue wavelength.

In the liquid crystal panel including the above configuration, alignment directions of the liquid crystal molecules are controlled by driving the horizontal electric field while maintaining high contrast derived from vertical alignment. This makes it unnecessary to perform alignment control by protrusions as in MVA mode, thereby realizing excellent viewing angle characteristics by a simple pixel configuration.

In addition, the first electrodes and the second electrodes function as a diffraction grating provided on the same substrate with the pitch distances therebetween.

In the liquid crystal panel in MVA mode of the related art (Comparative Example), at a location in a direction inclined with respect to the polarizing axis (for example, azimuth $\theta=45°$), as the polar angle $\phi$ with respect to the liquid crystal panel becomes larger, the shifting amounts (change amounts) of the white color (W) becomes larger, and problem in that the white color is seen to be tinged with yellow, occurs (see FIGS. 10 and 15).

Herein, with the verification results of the color shifting which will be described later, by using functions of the diffraction grating due to the first and second electrodes, it was found that, in a case where the pitches (electrode pitches D) of first and second electrodes are set to be the predetermined value (for example, D=10 µm), the shifting amounts of red color (R) and green color (G) become larger than the shifting amounts of blue color (B), and the shifting amounts of the white color (W) become smaller (see FIG. 16).

Further, it was found that there was a correlation between the diffraction efficiency, the electrode pitch D, and the wavelength of the colors, and in a case where the electrode pitch D is in the predetermined range, as the wavelength is longer, the diffraction efficiency becomes larger (see FIGS. 12, 13, and 14). From the result of the electrode pitch D=10 µm (FIG. 16) which is in the predetermined range, it was investigated that, as the diffraction efficiency becomes larger, the color shifting amounts become significant.

That is, in a case where the electrode pitch D is in the predetermined range, it was found that, when the optical diffraction efficiency for red wavelength and the optical diffraction efficiency for green wavelength are larger than the optical diffraction efficiency for blue wavelength, the shifting amounts of the white color is slight.

Accordingly, by setting the pitch distances (electrode pitch D) between the first and second electrodes so that the optical diffraction efficiency for red wavelength and the optical diffraction efficiency for green wavelength are larger than the optical diffraction efficiency for blue wavelength, it is possible to suppress the color change (see FIGS. 10 and 16) occurred in the related art.

Thus, according to the configuration described above, it is possible to realize a liquid crystal panel having a wide viewing angle with less color change with a simple configuration.

In addition, in the liquid crystal display apparatus of the present invention, it is preferable that 6 µm≤D≤10 µm, when D is the pitch distances.

By setting the pitch distances (electrode pitch D) between the first and second electrodes in a range of 6 µm≤D≤10 µm, it is possible to suppress the color change (see FIG. 10 and Tables 18 and 19) occurred in the related art.

In addition, in the liquid crystal display apparatus of the present invention, it is preferable that in a case where a plurality of types are set for the pitch distances in one pixel, 6 µm≤D1≤10 µm be satisfied when D1 is at least one type of pitch distances, and 6 µm≤Dm≤10 µm be satisfied when Dm is an average of the entire pitch distances occupying the pixel.

Also in the case where the plurality of types of electrode pitches D are set in one pixel, by setting at least one type of electrode pitch D1 in the range of 6 µm≤D1≤10 µm and by setting the average value Dm of all electrode pitches occupying the pixel in the range of 6 µm≤Dm≤10 µm, it is possible to suppress the color change (see FIG. 10) occurred in the related art.

In addition, in the liquid crystal display apparatus of the present invention, it is also possible that the second substrate is provided with another electrodes thereon.

In addition, in the liquid crystal display apparatus of the present invention, it is also possible that the first substrate is further provided with third electrodes thereon.

In addition, in the liquid crystal display apparatus of the present invention, it is also possible that the first electrodes and the second electrodes have teeth interleaving each other.

According to the above configuration, since the first and second electrodes are formed in the comb-shaped electrodes, it is possible to include a function as a diffraction grating with a simple configuration.

In addition, in the liquid crystal display apparatus of the present invention, it is preferable that a liquid crystal material be a positive liquid crystal material in which the liquid crystal molecules have positive dielectric anisotropy.

In addition, in the liquid crystal display apparatus of the present invention, it is preferable that 280≤Δnd≤350 be satisfied when Δnd is retardation of the liquid crystal layer.

According to the above configuration, it is possible to realize high contrast.

In addition, in the liquid crystal display apparatus of the present invention, it is also possible that the first electrodes are common electrodes, and the second electrodes are pixel electrodes.

In the liquid crystal display apparatus according to the present invention includes the liquid crystal panel according to the present invention.

According to the above configuration, it is possible to provide a liquid crystal display apparatus having a wide viewing angle with less color change with a simple configuration.

The present invention is not limited to the embodiments described above, and various modifications can be performed in a range stated in claims. Embodiments which can be obtained by suitably combining technical means disclosed in each embodiment are included in the technical scope of the present invention.

Industrial Applicability

The liquid crystal panel and the liquid crystal display apparatus of the present invention is a vertical alignment type liquid crystal panel using a horizontal electric field system, and since the liquid crystal panel includes a high speed response property, a wide viewing angle, high contrast characteristics, and has less color change, the liquid crystal panel can be suitably used for many purposes, such as a common board for outdoor use, a mobile device such as a mobile phone or a PDA, and the like.

REFERENCE SIGNS LIST

1: Liquid Crystal Display Apparatus
2: Liquid Crystal Panel
3: Driving circuit
4: Backlight
5: Liquid Crystal Cell
6: Pixel
6B: Sub-Pixel
6G: Sub-Pixel
6R: Sub-Pixel
10: Substrate (First Substrate)
11: Glass Substrate
12: Sheet-shaped Electrode (Third Electrode)
13: Insulating Layer
14: Comb-shaped Electrode (First Electrode)
15: Comb-shaped Electrode (Second Electrode)
14A: Tooth Electrode
15A: Tooth Electrode
16: Alignment Film
20: Substrate (Second Substrate)
21: Glass Substrate
22: Color Filter
23: Black Matrix
24: Sheet-shaped Electrode (Electrode)
25: Insulating Layer
26: Alignment Film
30: Rib
35: Polarizer
36: Polarizer
50: Liquid Crystal Layer
52: Liquid Crystal Molecules
60: Substrate (Second Substrate)
70: Substrate (First Substrate)
100: Liquid Crystal Panel

The invention claimed is:

1. A liquid crystal panel comprising:
a first substrate on which first electrodes and second electrodes are provided with pitch distances between the first electrodes and the second electrodes, respectively;
a second substrate provided to face the first substrate; and
a liquid crystal layer sandwiched between the first substrate and the second substrate,
wherein the horizontal electric field driving system is used in which the liquid crystal layer is driven with horizontal electric fields generated between the first electrodes and the second electrodes, and liquid crystal molecules in the liquid crystal layer are aligned vertically to the first substrate and the second substrate when no electric field is applied on the liquid crystal molecules,
each pixel includes three sub-pixels, which are of red, green, and blue,
the first electrodes and the second electrodes function as a diffraction grating constituted by the first electrodes, the second electrodes, and the pitch distances therebetween,
the pitch distances between the first electrodes and the second electrodes are set such that an optical diffraction efficiency for red wavelength and an optical diffraction efficiency for green wavelength are greater than an optical diffraction efficiency for blue wavelength.
in a case where a plurality of types are set for the pitch distances in one pixel, 6 µm ≤D1 ≤10 µm is satisfied when D1 is at least one of the plurality of types of pitch distances, and 6 µm ≤Dm ≤10 µm is satisfied when Dm is an average of all of the pitch distances occupying the pixel, and
a display mode of the liquid crystal panel is a transmission mode in which display is performed by controlling light intensity of light transmitted through the liquid crystal panel.

2. The liquid crystal panel according to claim 1, wherein the second substrate is further provided with electrodes thereon.

3. The liquid crystal panel according to claim 1, wherein the first substrate is further provided with third electrodes thereon.

4. The liquid crystal panel according to claim 1, wherein the first electrodes and the second electrodes have teeth interleaving each other.

5. The liquid crystal panel according to claim 1, wherein a liquid crystal material is a positive liquid crystal material in which the liquid crystal molecules have positive dielectric anisotropy.

6. The liquid crystal panel according to claim 1, wherein 280 nm≤Δnd≤350 nm is satisfied when Δnd is retardation of the liquid crystal layer.

7. The liquid crystal panel according to claim 1, wherein the first electrodes are common electrodes, and the second electrodes are pixel electrodes.

8. A liquid crystal display apparatus comprising the liquid crystal panel according to claim 1.

* * * * *